(12) United States Patent
Ghaffarivardavagh et al.

(10) Patent No.: US 12,432,491 B2
(45) Date of Patent: Sep. 30, 2025

(54) METHODS AND APPARATUS FOR WIDEBAND ACOUSTIC COMMUNICATION

(71) Applicant: Massachusetts Institute of Technology, Cambridge, MA (US)

(72) Inventors: Reza Ghaffarivardavagh, Boston, MA (US); Sayed Saad Afzal, Cambridge, MA (US); Osvy Rodriguez, Cambridge, MA (US); Fadel Adib, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 269 days.

(21) Appl. No.: 18/139,563

(22) Filed: Apr. 26, 2023

(65) Prior Publication Data

US 2023/0269530 A1 Aug. 24, 2023

Related U.S. Application Data

(62) Division of application No. 17/227,334, filed on Apr. 11, 2021, now Pat. No. 11,678,112.

(Continued)

(51) Int. Cl.
*H04R 17/00* (2006.01)
*H04B 11/00* (2006.01)
(Continued)

(52) U.S. Cl.
CPC .............. *H04R 1/44* (2013.01); *H04B 11/00* (2013.01); *H04B 13/02* (2013.01); *H04R 17/10* (2013.01); *H04R 17/005* (2013.01)

(58) Field of Classification Search
CPC ........ H04R 1/44; H04R 17/10; H04R 17/005; H04B 11/00; H04B 13/02
See application file for complete search history.

(56) References Cited

U.S. PATENT DOCUMENTS 3,457,543 A 7/1969 Akervold
5,070,486 A 12/1991 Boucher
(Continued)

FOREIGN PATENT DOCUMENTS

WO WO 99/56233 11/1999

OTHER PUBLICATIONS

Butler et al.; "Ultra Wideband Multiple Resonant Transducer"; Oceans 2003 Celebrating the Past . . . Teaming Toward the Future (IEEE Cat. No. 03CH37492); vol. 5; Sep. 2003; 7 Pages.
Jang et al.; "Underwater Backscatter Networking"; Association for Computing Machinery—SIGCOMM; Aug. 2019; 13 Pages.
Liu et al.; "Acoustic Metamaterials with broadband and wide-angle impedance matching"; Physical Review Materials; vol. 2; Apr. 12, 2018; 8 Pages.
(Continued)

*Primary Examiner* — Krystine E Breier
(74) *Attorney, Agent, or Firm* — Daly, Crowley, Mofford & Durkee, LLP

(57) ABSTRACT

An ultra-wide bandwidth acoustic transducer may include multiple layers, including an inner piezoelectric layer, a polymer coupling layer and an outer piezoelectric layer. The polymer layer may be located between, and may be bonded to, the inner and outer piezoelectric layers. The transducer may have multiple eigenfrequencies of vibration. These eigenfrequencies may include primary resonant frequencies of the inner and outer piezoelectric layers respectively and may also include resonant frequencies that arise due to coupling between the layers. An acoustic backscatter system may employ such a transducer in backscatter nodes as well as in a transmitter. The multiple eigenfrequencies may enable the system to perform spread-spectrum communication at a high throughput. These multiple eigenfrequencies may also enable each backscatter node to shift frequency of an uplink signal, which in turn may enable the system to mitigate self-interference and to decode concurrent signals from multiple backscatter nodes.

6 Claims, 10 Drawing Sheets

Related U.S. Application Data

(60) Provisional application No. 63/018,472, filed on Apr. 30, 2020.

(51) Int. Cl.
  *H04B 13/02* (2006.01)
  *H04R 1/44* (2006.01)
  *H04R 17/10* (2006.01)

(56) References Cited

U.S. PATENT DOCUMENTS

| | | | |
|---|---|---|---|
| 5,452,267 A * | 9/1995 | Spevak | G10K 13/00 310/334 |
| 6,617,765 B1 | 9/2003 | Lagier et al. | |
| 6,950,373 B2 | 9/2005 | Butler et al. | |
| 7,876,027 B2 | 1/2011 | Cochran et al. | |
| 8,027,224 B2 | 9/2011 | Brown et al. | |
| 9,503,199 B2 * | 11/2016 | Hiller | H04B 11/00 |
| 10,300,309 B2 | 5/2019 | Maharbiz et al. | |
| 11,424,839 B2 | 8/2022 | Jang et al. | |
| 2005/0162255 A1 | 7/2005 | Goel et al. | |
| 2014/0016558 A1 | 1/2014 | Lawry et al. | |
| 2015/0049587 A1 | 2/2015 | Lawry et al. | |
| 2021/0345038 A1 | 11/2021 | Ghaffarivardavagh et al. | |

OTHER PUBLICATIONS

Ma et al.; "Acoustic metamaterials: From local resonances to broad horizons"; Sci. Adv. Acoustics; Feb. 26, 2016; 16 Pages.

Miquel; "UWB Antenna Design for Underwater Communications"; May 25, 2009; 93 Pages.

Muller et al.; "Natural frequencies of a multi-degree-of-freedom-vibration system"; PAMM, Proc. Appl. Math. and Mech.; vol. 6, No. 1; Dec. 2006; 2 Pages.

Qiu et al.; "Piezoelectric Micromachined Ultrasound Transducer (PMUT) Arrays for Integrated Sensing, Actuation and Imaging"; Sensors; vol. 15; Apr. 3, 2015; 22 Pages.

Ramesh et al.; "Experimental and finite element modelling studies on single-layer and multi-layer 1-3 piezocomposite transducers"; ScienceDirect, Ultrasonics; vol. 44; Feb. 28, 2006; 9 Pages.

Sadeghpour; "A Piezoelectric Micromachined Ultrasound Transducers (pMUT) Array, for Wide Bandwidth Underwater Communication Applications"; Proceedings; vol. 1, No. 4; Aug. 2017; 5 Pages.

Smith; "Modeling 1-3 Composite Piezoelectrics: Hydrostatic Response"; IEEE Transactions on Ultrasonics, Ferroelectrics, and Frequency Control; vol. 40, No. 1; Jan. 1993; 9 Pages.

Wang et al.; "The Simulation and Test for Piezoelectric Composite Tube"; MATEC Web of Conferences; SAME 2016; vol. 67; 2016; 6 Pages.

* cited by examiner

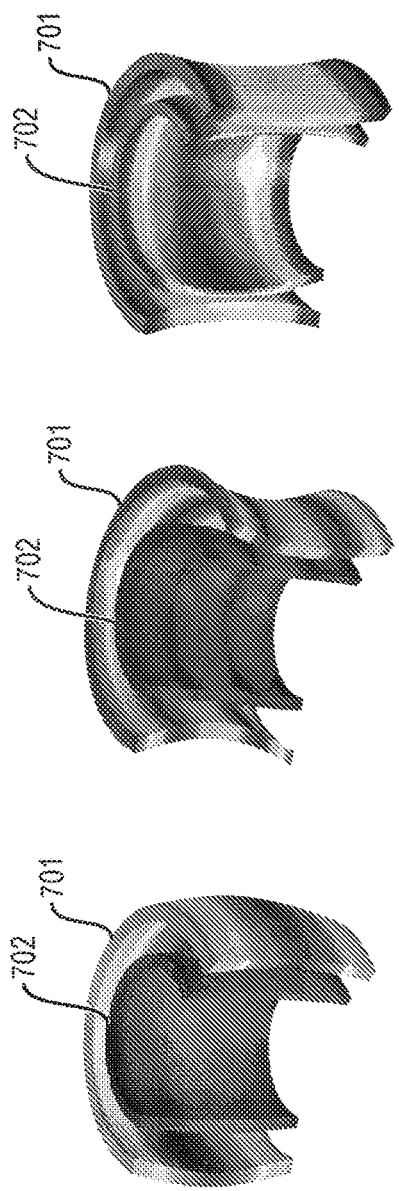
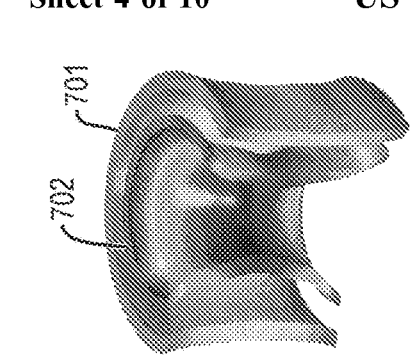
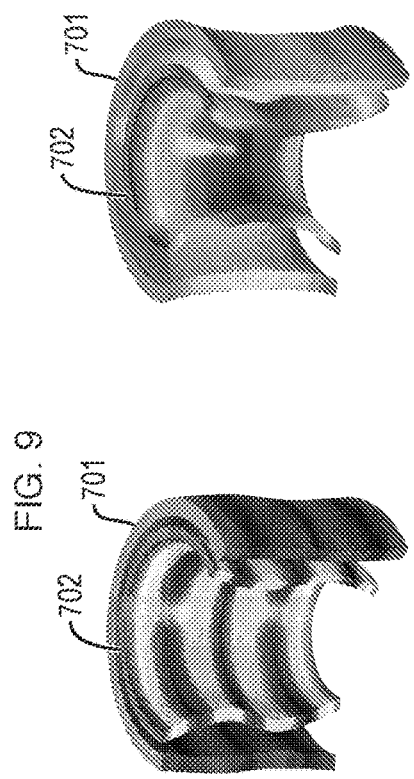
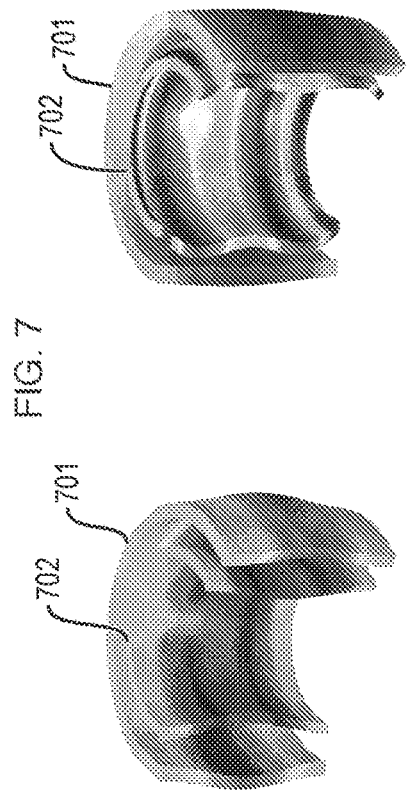
FIG. 7 FIG. 8 FIG. 9 FIG. 13
FIG. 10 FIG. 11 FIG. 12

METHODS AND APPARATUS FOR WIDEBAND ACOUSTIC COMMUNICATION

RELATED APPLICATIONS

This application is a divisional of U.S. application Ser. No. 17/227,334, filed on Apr. 11, 2021 which claims the benefit of U.S. Provisional Application No. 63/018,472 filed Apr. 30, 2020 (the "Provisional").

STATEMENT REGARDING FEDERALLY SPONSORED RESEARCH

This invention was made with government support under N00014-19-1-2325 awarded by the Office of Naval Research. The government has certain rights in the invention.

FIELD OF TECHNOLOGY

The present invention relates generally to acoustic communication.

SUMMARY

In exemplary implementations of this invention, an acoustic transducer includes multiple concentric layers, including an inner piezoelectric layer, a polymer coupling layer, and an outer piezoelectric layer. The polymer layer may be positioned between the inner and outer piezoelectric layers. The polymer layer may be coupled with both the inner and outer piezoelectric layers (e.g., by chemical adhesion, dispersive adhesion, diffusive adhesion, and/or mechanical attachment).

In some cases, the concentric layers of the acoustic transducer are cylindrical. In other cases, the concentric layers are spherical.

The acoustic transducer may comprise a mechanical system with multiple natural resonant frequencies (eigenfrequencies). These multiple eigenfrequencies may arise due to the multiple concentric layers and due to coupling between the layers. For instance, the eigenfrequencies of the acoustic transducer may include: (a) a resonant frequency at which the outer piezoelectric layer would resonant, if the outer layer were not mechanically coupled with the other layers; (b) a resonant frequency at which the inner piezoelectric layer would resonant, if the inner layer were not mechanically coupled with the other layers; and (c) multiple resonant frequencies that arise due to mechanical coupling—via the polymer coupling layer—between the inner and outer piezoelectric layers.

In some cases, different eigenfrequencies occur in different vibration modes of the transducer. Each vibration mode may be associated with a different eigenfrequency. Mechanical coupling—via the polymer coupling layer—between the inner and outer piezoelectric layers may increase the number of vibration modes, and may thus increase the number of eigenfrequencies.

For instance, different eigenfrequencies may occur when the concentric layers vibrate in different "bending" modes. In each "bending" mode, different parts of one or more piezoelectric layers may vibrate out-of-phase with each other. As non-limiting examples: In a first "bending" mode, the vertical top and bottom of a layer may vibrate out of phase with a vertical middle of the layer in such a way the vertical top and bottom of the layer move radially outward while the vertical middle of the layer moves radially inward (and vice versa). In a second "bending" mode, inner and outer piezoelectric layers may vibrate out of phase with each other in such a way that the vertical middle of the inner piezoelectric layer is bending radially outward while the vertical middle of the outer piezoelectric layer is bending radially inwards (and vice versa). In other "bending" vibration modes, multiple portions of a layer vibrate out-of-phase with each other, in such a way that multiple portions of the layer move radially outward while multiple other portions of the layer move radially inward (and vice versa).

In some vibration modes, one or more cylindrical piezoelectric layers vibrate in a direction parallel to their cylindrical axis (instead of a radial direction). In some vibration modes, at least one entire layer radially vibrates in phase with itself, in such a way that the entire layer moves radially outward and then the entire layer moves radially inward.

Thus, the multiple concentric layers of the transducer and mechanical coupling between the layers may give rise to multiple degrees of freedom of vibration, each of which is associated with a different eigenfrequency. In illustrative implementations, each of the eigenfrequencies is a natural resonant frequency of the acoustic transducer.

In illustrative implementations, the multiple eigenfrequencies enable the transducer to have an ultra-wide bandwidth (UWB) for acoustic communication. For instance, the ultra-wide bandwidth of the transducer may be larger than 20% of the transducer's acoustic center frequency.

Due to its ultra-wide bandwidth, the acoustic transducer may communicate via a spread-spectrum acoustic signal. For instance, the spread-spectrum acoustic signal may comprise multiple orthogonal frequency channels. The orthogonal frequency channels may be selected in such a way that the harmonics of each frequency channel do not interfere with any other frequency channel (e.g., because the harmonic peaks coincide with nulls of the other frequency channels).

The throughput of the UWB acoustic transducer may be much greater than the throughput of a conventional acoustic transducer. For instance, a prototype of this invention has achieved a throughput of up to 20 kilobytes per second with excellent SNR (signal-to-noise ratio). This higher throughout may be because the acoustic transducer in the present invention can employ a spread-spectrum signal. (In contrast, a conventional acoustic transducer may have only a single piezoelectric layer and only a single resonant frequency and the SNR of its signal may decline precipitously outside this single resonant frequency, causing the conventional transducer to operate over only a single frequency channel).

In some implementations of this invention, the UWB acoustic transducer is part of a backscatter communication system. This communication system may include an acoustic projector, a microphone and at least one backscatter node. Each of the backscatter nodes in the system may include a UWB acoustic transducer (with multiple piezoelectric layers and multiple eigenfrequencies). Also, the acoustic projector may include a UWB acoustic transducer (again, with multiple piezoelectric layers and multiple eigenfrequencies).

In the backscatter communication system, the acoustic projector may transmit an acoustic signal that travels to the backscatter node, then reflects from the backscatter node, and then travels back to the microphone.

To communicate information, the backscatter node may modulate the acoustic signal as it reflects from the node. To modulate the acoustic signal as it reflects, the backscatter node may vary the electrical impedance of a circuit connected across terminals of one or more piezoelectric layers of an acoustic transducer onboard the node. This electrical impedance may in turn control how much mechanical strain these piezoelectric layer(s) undergo—e.g., how much they elastically deform in response to the downlink acoustic signal that is incident on the node. The amount of strain that these piezoelectric layers undergo may be inversely related to their acoustic reflectance—that is, the piezoelectric layer(s) may be more acoustically reflective the less mechanical strain they undergo. By controlling the electrical impedance across terminals of one or more of the piezoelectric layers, the backscatter node may thus control its acoustic reflectance (and acoustic reflection coefficient) in a time-varying manner, in such a way as to control amplitude and phase of the uplink signal that reflects from the backscatter node. The modulated signal that reflects from the backscatter node may encode data. This data may comprise a temporal sequence of bits (e.g., "1"s and "0"s). For instance, an uplink signal may encode a "1" when its amplitude is high (because the node's acoustic reflectance is high) and may encode a "0" when its amplitude is low (because the node's acoustic reflectance is low). The modulated signal may be received by the microphone and decoded by a computer. In some case, the data encoded by the uplink signal represents measurements taken by one or more sensors onboard a backscatter node.

As noted above, multiple layers and multiple eigenfrequencies of an acoustic transducer may give the transducer an ultra-wide bandwidth, and may enable the transducer to perform spread-spectrum communication. Thus, different data may be encoded in different frequency channels.

In some implementations of this invention, the ultra-wide bandwidth of the acoustic transducer is used to overcome self-interference that would otherwise occur in a backscatter acoustic communication system. This self-interference could, unless it were mitigated, arise due to interference between a downlink signal and an uplink signal, where: (a) the downlink signal is emitted by the acoustic projector and travels to the backscatter node but also travels to the microphone; and (b) the uplink signal is a modulated signal that reflects from an acoustic transducer onboard the backscatter node. This self-interference could, unless it were mitigated, effectively drown out the uplink signal, because the amplitude of the downlink signal received by the microphone may be much greater than the amplitude of the uplink signal received by the microphone.

To mitigate this self-interference, a backscatter node may shift the frequency of the uplink signal that reflects from the node, in such a way that frequency of the uplink signal is different from frequency of the downlink signal. For instance: (a) the acoustic projector may transmit a downlink signal at a center frequency of $f_C$; and (b) a backscatter node may shift frequency of the uplink signal that reflects from the node, causing the uplink signal to reflect from the node at frequencies $f_C+f_0$ and $f_C-f_0$. Put differently, the uplink signal that reflects from a backscatter node may have amplitude peaks at two frequencies $f_C+f_0$ and $f_C-f_0$. The signal received by the microphone may be filtered to remove the effect of the downlink signal. For instance, an analog filter (e.g., an analog high-pass filter) may filter out the downlink signal.

In illustrative implementations of this invention, the shift in frequency described in the preceding paragraph may be easily performed by the backscatter node, due to the ultra-wide bandwidth of the acoustic transducer onboard the node. This ultra-wide bandwidth of the transducer may be due to multiple eigenfrequencies which occur because of coupled layers of the transducer, as discussed above.

A UWB acoustic transducer (with multiple layers and multiple eigenfrequencies) may be employed to enable acoustic communication over much longer distances than is achievable by conventional acoustic transducers. For instance, in a prototype of this invention, an UWB acoustic transducer onboard an underwater backscatter node enabled acoustic communication through water with excellent SNR (e.g., SNR>3 dB) at roundtrip distances of up to 60 meters. This increased distance of communication may be achieved as follows. To eliminate self-interference in the system, the UWB acoustic transducer may shift the frequency of the uplink signal that reflects from the backscatter node. Without self-interference, the acoustic projector may transmit a downlink signal at a higher amplitude without saturating the microphone. Increasing the amplitude of the downlink signal may in turn increase amplitude of the uplink signal, which in turn may increase SNR of the uplink signal.

UWB acoustic transducers may be used in a communication system with multiple backscatter nodes. The communication system may employ an FDMA-like protocol to separate concurrent signals from the backscatter nodes. To do so, each backscatter node in the system may reflect an uplink signal at a different center frequency than does any other node in the system. Specifically, each backscatter node may include a UWB acoustic transducer that has multiple, mechanically coupled layers and multiple eigenfrequencies. The UWB acoustic transducer onboard each respective backscatter node may be employed to shift the uplink signal to a center frequency that is unique for that node.

For example, in a communication system with multiple backscatter nodes: (a) an acoustic projector may transmit downlink signals at a center frequency of $f_C$; (b) a first backscatter node A may shift the frequency of a first uplink signal that reflects from the first backscatter node, causing the center frequency of the first uplink signal to be $f_C-f_A$; and (c) a second backscatter node B may shift the frequency of a second uplink signal that reflects from the second backscatter node, causing the center frequency of the second uplink signal to be $f_C-f_B$. The overall signal received by the microphone may be filtered to separate concurrent uplink signals which are at different center frequencies. For instance, bandpass filters may be employed to separate the uplink signals at the different frequencies. These filters may be either analog or digital.

In a communication system with multiple backscatter nodes, the uplink signals of respective backscatter nodes may be orthogonal to each other (so that their harmonics do not interfere). Furthermore, the system may employ a MAC (media access control) protocol layer which maximizes distance between the center frequencies of the respective uplink signals of the respective backscatter nodes.

In some cases, the acoustic transmitter transmits downlink signals which include instructions that allocate the center frequencies of the uplink signals for the various backscatter nodes in a communication system. The downlink signals may specify the center frequency at which each respective backscatter will reflect an uplink signal.

In some cases, each backscatter node includes circuitry that may drive the acoustic transducer at any of a variety of different excitation frequencies. For instance, this circuitry may comprise multiple oscillators or may comprise a single adjustable oscillator (e.g., a voltage-controlled oscillator). A microcontroller onboard each backscatter node may, based on instructions received in a downlink signal, select the excitation frequency at which to excite the UWB transducer onboard the node.

In some cases, a UWB acoustic transducer (with multiple layers and multiple eigenfrequencies) is employed for low-power, underwater communication. For instance, the UWB acoustic transducer may be employed for communication through either fresh water (e.g., in a river) or salt water (e.g., in an ocean). Alternatively, in some cases, the UWB transducer is employed for communication through one or more solid, gaseous and/or liquid materials, such as metal, cement, soil, air, oil, water, and/or other liquids.

In some cases, each backscatter node in the system harvests energy from downlink acoustic signals. The multiple layers of the acoustic transducer may be employed to enable simultaneous acoustic communication and acoustic energy harvesting. For instance, in some cases: (a) two terminals of an outer piezoelectric layer of the transducer are electrically connected across a circuit that controls the acoustic impedance of that layer and thus controls modulation of the uplink signal that reflects from the transducer; (b) two terminals of an inner piezoelectric layer of the transducer are electrically connected across an energy-harvesting circuit; and (c) communication and energy harvesting are performed concurrently.

In some cases, the UWB acoustic transducer operates in at least a portion of the audio spectrum. Alternatively, the UWB acoustic transducer may operate in at least a portion of the ultrasonic spectrum. Alternatively, the UWB acoustic transducer may operate in at least a portion of the audio spectrum and in at least a portion of the ultrasonic spectrum.

In some cases, each polymer coupling layer in the acoustic transducer is positioned between two piezoelectric layers and has a Young's modulus that is less than that of each of these two piezoelectric layers.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIGS. 7, 8, 9, 10, 11, 12, and 13 show amplitude of vibration in different vibration eigenmodes that correspond to different eigenfrequencies.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

Acoustic Transducer

Many conventional acoustic transducers have only a single layer of piezoelectric material, which has only a single resonant frequency. The SNR for acoustic communication with these conventional transducers tends to drop off sharply outside of that single resonant frequency. As a result, these conventional transducers cannot be practically used for spread-spectrum communication.

Figure 1:
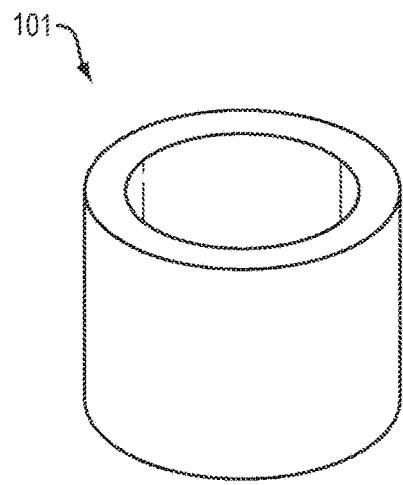
FIG. 1 shows a single piezoelectric layer of an acoustic transducer.
Figure 2:
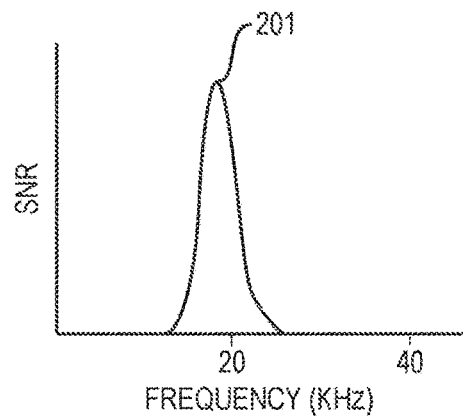
FIG. 2 plots signal-to-noise ratio (SNR) as a function of frequency, for acoustic communication employing an acoustic transducer with only a single piezoelectric layer.

FIG. 1 shows a single piezoelectric layer 101, in a conventional acoustic transducer. FIG. 2 shows an example of signal-to-noise ratio (SNR) as a function of frequency, for acoustic communication employing a conventional transducer with only a single piezoelectric layer. In FIG. 2, the resonant frequency is 20 kHz. As can be seen from FIG. 2, in a conventional transducer with only a single piezoelectric layer, SNR may have a single peak 201 at the resonant frequency of that single layer and may drop off precipitously outside of that resonant frequency.

In contrast, the acoustic transducer in the present invention may have an ultra-wide bandwidth and may be well-suited for spread-spectrum communication.

In illustrative implementations of this invention, an acoustic transducer has multiple layers, including an inner piezoelectric layer, a polymer coupling layer, and an outer piezoelectric layer. These layers may be concentric, nested one within another. The multiple layers and coupling between the multiple layers may cause the transducer in the present invention to have multiple resonant frequencies (eigenfrequencies) and to thus be well-suited for spread-spectrum communication.

Figure 3:
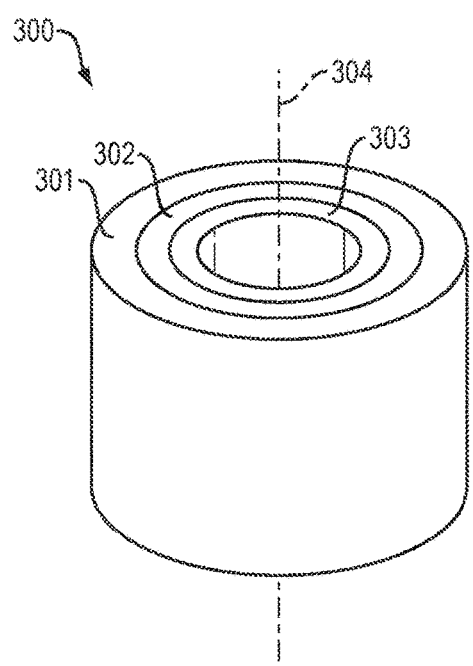
FIG. 3 shows a cross-section of concentric, cylindrical layers of an acoustic transducer.

As noted above, the layers of the transducer may be cylindrical. FIG. 3 shows a cross-section of concentric cylindrical layers of an acoustic transducer 300, in an illustrative implementation of this invention. These cylindrical layers include an inner piezoelectric layer 303, a polymer coupling layer 302, and an outer piezoelectric layer 301.

Figure 15:
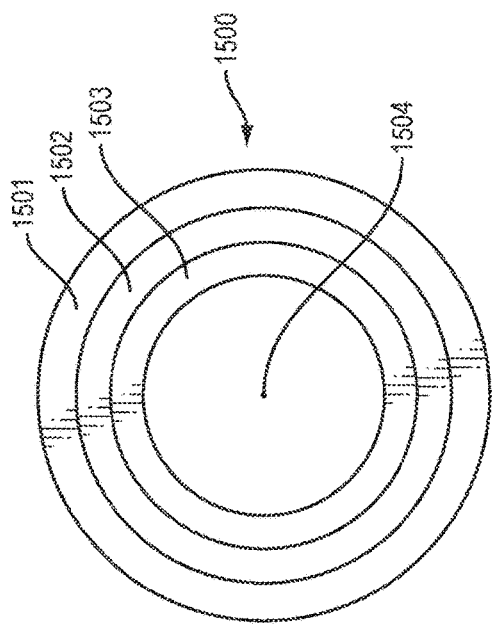
FIG. 15 shows a cross-section of concentric spherical layers of an acoustic transducer.

In FIGS. 3 and 15, each of the piezoelectric layers (e.g., 301, 303, 1501, 1503) may have a different nominal resonant frequency. For instance, in a prototype of this invention, an outer piezoelectric layer of the acoustic transducer has a nominal resonance frequency of 17 kHz and an inner piezoelectric layer of the transducer has a nominal resonance frequency of 30 KHz.

Put differently, each piezoelectric layer in the transducer may have a resonant frequency that is different than the resonant frequency of any other piezoelectric layer in the transducer (ignoring, for purposes of this sentence, resonant frequencies that arise due to coupling between layers).

In some cases, the piezoelectric material in each of the piezoelectric layers (e.g., 301, 303, 1501, 1503) comprises a PZT polycrystalline ceramic. (PZT is a solid solution of PbZrO3 and PbTi 03). Or, for instance, the piezoelectric material may comprise a single crystal, such as PZN-PT single crystal (i.e., a single crystal of a solid solution of lead zinc niobate and lead titanate) or a PMN-PT single crystal (i.e., a single crystal of a solid solution of lead magnesium niobate and lead titanate). Or, for instance, the piezoelectric material may comprise a piezoelectric polymer or a piezoelectric composite.

The coupling layer (e.g., 302, 1502) may comprise polyurethane. However, this invention is not limited to polyurethane; other polymers may be employed for the coupling layer. For instance, the coupling layer may comprise an acrylate, urethane or epoxy that forms when two or more components chemically react. The chemical reaction may produce a cross-linked polymer. This polymer may bond to two adjoining piezoelectric layers during curing. As a non-limiting example, the coupling layer may comprise a polymer that forms by mixing polyester and polyurethane resins, or by mixing polyols and polyurethane resin, or by mixing acrylic polymers and polyurethane resins. More generally, the coupling layer may comprise a polymeric substance with adhesive properties. For example, the polymeric substance may comprise a thermoset polymer, thermoplastic polymer, or elastomer. Also, for example, the coupling layer may comprise a polymer that includes polyethylene, polypropylene, polyvinyl chloride, plasticizers, polyimide, acrylate, urethane, epoxy, neoprene, natural rubber, synthetic rubber or a combination of one or more of the foregoing.

If the transducer is cylindrical, then the polymer coupling layer may be positioned between and touching two piezoelectric layers, one of which is radially closer to the cylindrical axis of the transducer than is the coupling layer and the other of which is radially farther from the cylindrical axis of the transducer than is the coupling layer. If the transducer is spherical, then the polymer coupling layer may be positioned between and touching two piezoelectric layers, one of which is radially closer to the spherical center of the transducer than is the coupling layer and the other of which is radially farther from the spherical center of the transducer than is the coupling layer.

In illustrative implementations of this invention, a polymer coupling layer attaches to both a first piezoelectric layer and a second piezoelectric layer (which adjoin the coupling layer on opposite sides of the coupling layer) in such a way that vibration in the first piezoelectric layer is transmitted through the coupling layer and causes vibration in the second piezoelectric layer and vice versa.

The polymer coupling layer may be attached to neighboring piezoelectric layers by chemical adhesion (e.g., due to covalent bonding or ionic bonding), dispersive adhesion (e.g., due to van der Waals force), diffusive adhesion (e.g., due to polymer chains from one material diffusing into another material), and/or mechanical attachment (e.g., due to interlocking). In some cases, a polymer layer and an adjoining piezoelectric layer are attached to each other due to: (a) chemical bonds that form between them; (b) electrostatic forces; (c) van der Waals forces; or (d) diffusion of polymer (e.g., from the polymer layer into the adjoining piezoelectric layer). As a non-limiting example, in a prototype of this invention: (a) liquid precursors are mixed and poured between two piezoelectric layers and then cure to form polyurethane; and (b) during the curing, the polyurethane bonds to the two piezoelectric layers.

The number of layers in the transducer may vary, depending on the particular implementation of this invention. In the example shown in FIG. 3, the acoustic transducer has two piezoelectric layers and a coupling layer that is located between the two piezoelectric layers. Alternatively, the acoustic transducer may have at least three piezoelectric layers and at least two coupling layers. Each coupling layer of the transducer may comprise polymer. Each coupling layer of the transducer may be located between, may touch, and may be bonded to, two piezoelectric layers of the transducer.

In the examples shown in FIGS. 3 and 15, the piezoelectric layers and the polymer coupling layer are concentric. In FIG. 3, the piezoelectric layers 301, 303 and the polymer coupling layer 302 are concentric about the cylindrical axis 304 of the transducer. In FIG. 15, the piezoelectric layers 1501, 1503 and the polymer coupling layer 1502 are concentric about the spherical center 1504 of the transducer. In either case (cylindrical or spherical), the concentric arrangement of the layers may cause the acoustic transducer to be omnidirectional—i.e., to transmit an acoustic signal at an equal amplitude in all directions and/or to receive acoustic signals with equal sensitivity from all directions. An omnidirectional transducer may be desirable in many use scenarios, such as an Internet-of-Things use scenario in which transducers are housed in many different backscatter nodes which may be in any arbitrary orientation relative to an acoustic transmitter/receiver.

Alternatively, in some implementations, the piezoelectric layers and the polymer coupling layer(s) are not concentric. For instance, in some cases, the piezoelectric layers and the polymer coupling layer(s) are each parabolic in shape. A parabolic shape may facilitate directional communication, in which the amplitude of transmission (and sensitivity of reception) is greater in some directions than in others.

Eigenmodes and Eigenfrequencies

A polymer coupling layer (e.g., 302, 1502) of the acoustic transducer may have a lower Young's modulus than that of each piezoelectric layer which adjoins and touches the coupling layer. The polymer layer between the two piezoelectric layers may be mechanically compliant (i.e., flexible), and thus may allow the inner and outer piezoelectric layers to vibrate independently to some extent. This may enable the overall transducer to have the eigenfrequency and eigenmode of each of the respective piezoelectric layers. Even though the polymer layer itself is flexible, the polymer layer may impose constraints on how the two layers vibrate with respect to each other, thus resulting in a coupled behavior. This coupling may provide additional degrees of freedom that lead to new eigenmodes and eigenfrequencies that would not be present in any of the individual piezoelectric layers.

As used herein, "eigenmode" means a mode of vibration that occurs at an eigenfrequency. Each eigenmode of vibration may result in a structure undergoing a characteristic spatiotemporal pattern of elastic deformation during that mode of vibration. Put differently, each eigenmode of vibration may cause a structure to bend or otherwise change shape in a characteristic spatiotemporal pattern of vibration. If multiple eigenmodes occur simultaneously, they may be superimposed on each other.

As noted above, the acoustic transducer may have a multi-layer configuration which spatially alternates between active (piezoelectric) layers and passive (polymer) layers. The acoustic transducer may exhibit two kinds of resonance. The first kind of resonance may be the primary resonance of each of the individual piezoceramic layers, respectively. The primary resonance of each respective piezoelectric layer may occur at what would be the natural resonant frequency of that layer in the absence of coupling. This primary resonant frequency of a piezoelectric layer (at which the layer would resonate in the absence of coupling) may differ from that of each other piezoelectric layer in the transducer by more than 1 percent, or more than 2 percent, or more than 3 percent, or more than 4 percent, or more than 5 percent, or more than 10 percent. The second kind of resonance may arise from passive coupling between the different active layers. A polymer coupling layer may be passive. However, by sandwiching the polymer layer between two piezoceramic layers, new constraints may be imposed on how the active layers may stretch and squeeze concurrently. This coupled interaction may yield additional resonances, thus enabling UWB operation. For instance, the additional resonances may in some cases fill in gaps between the primary resonances. The multiple eigenmodes and multiple eigenfrequencies may enable the acoustic transducer to achieve high-efficiency backscatter over an ultra-wide bandwidth.

Figure 4:
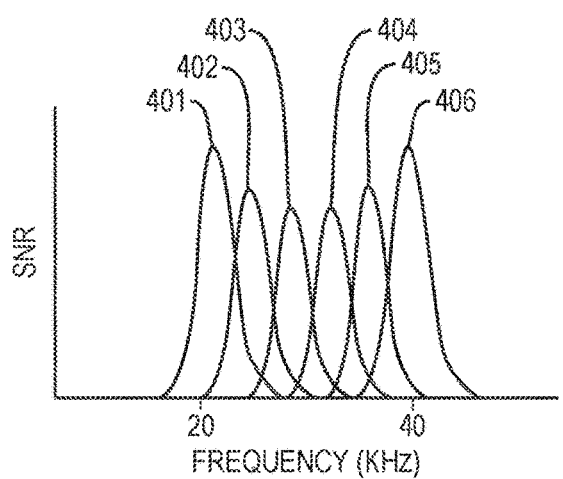
FIGS. 4 and 6 each show an example of multiple eigenfrequencies of an acoustic transducer.

FIG. 4 shows multiple eigenfrequencies of an UWB acoustic transducer (e.g., 300, 1500), in an illustrative embodiment of this invention. FIG. 4 plots SNR as a function of frequency, for acoustic communication by a transducer which has concentric, cylindrical layers, including an outer piezoelectric layer, an outer piezoelectric layer, and a polymer coupling layer sandwiched between the two piezoelectric layers. In the example shown in FIG. 4, the eigenfrequencies occur at the peaks 401, 402, 403, 404, 405, 406 of SNR in the plot. For instance: (a) peak 401 may occur at the nominal resonant frequency of the outer piezoelectric layer; (b) peak 406 may occur at the nominal resonant frequency of the inner piezoelectric layer; and (c) peaks 402, 403, 404, and 405 may occur at other eigenfrequencies that are due to coupling between these layers. The eigenfrequencies shown in FIG. 4 are non-limiting examples. The number, amplitude, and frequency distribution of eigenfrequencies may vary depending on, among other things, the dimensions, material composition and spatial arrangement of the layers of the acoustic transducer. For instance, vibration at an eigenfrequency due to coupling may have an amplitude that is less than, equal to, or greater than the amplitude of vibration at the nominal resonant frequency of any or all of the piezoelectric layers. Also, for instance, an eigenfrequency due to coupling: (a) may be lower in frequency than the nominal resonant frequency of each of the piezoelectric layers respectively; (b) greater in frequency than the nominal resonant frequency of each of the piezoelectric layers respectively; or (c) greater in frequency than the nominal resonant frequency of at least one of piezoelectric layers and less in frequency than the nominal frequency of at least one other of the piezoelectric layers. The nominal resonant frequency of a layer may be the layer's natural resonant frequency which would occur in the absence of coupling.

Figure 5B:
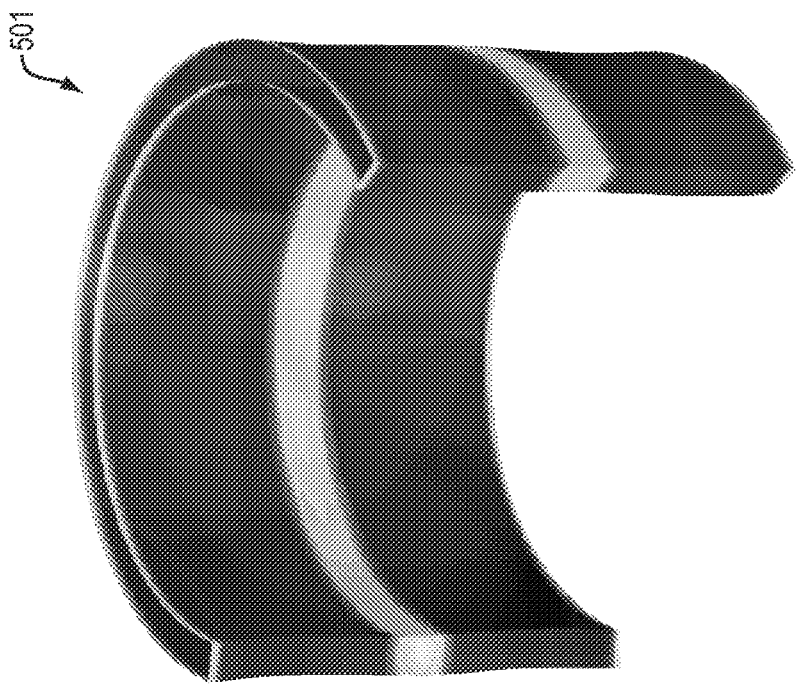
FIG. 5B illustrates amplitude of vibration of the same piezoelectric layer, when the layer is excited outside its resonance frequency.
Figure 5A:
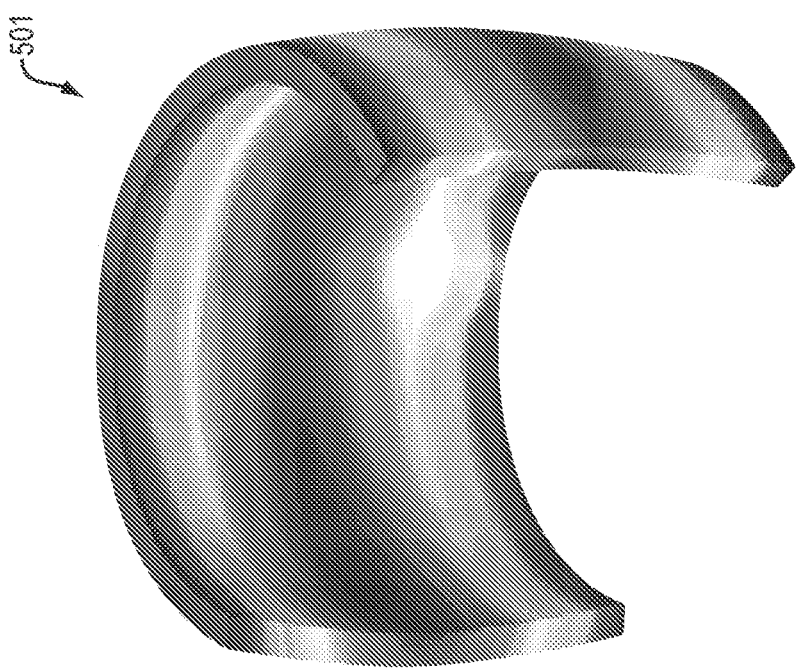
FIG. 5A illustrates amplitude of vibration of a piezoelectric layer, when the layer is excited at its resonance frequency.

It is helpful to compare multiple eigenfrequencies (which occur in illustrative embodiments of the present invention) to what would happen if only a single piezoelectric layer were used. FIG. 5A illustrates amplitude of vibration of a single piezoelectric layer 501, when that layer is excited at its resonance frequency and is not coupled with other layers. FIG. 5B illustrates amplitude of vibration of the same piezoelectric layer 501, when the layer is excited outside its resonance frequency and is not coupled with other layers. In FIGS. 5A and 5B, vibrations are visualized as a color heat map, in which red and blue represent high vibration amplitude and low vibration amplitude respectively. As can be seen in FIGS. 5A and 5B, the single layer by itself would have only a single natural resonant frequency.

Figure 6:
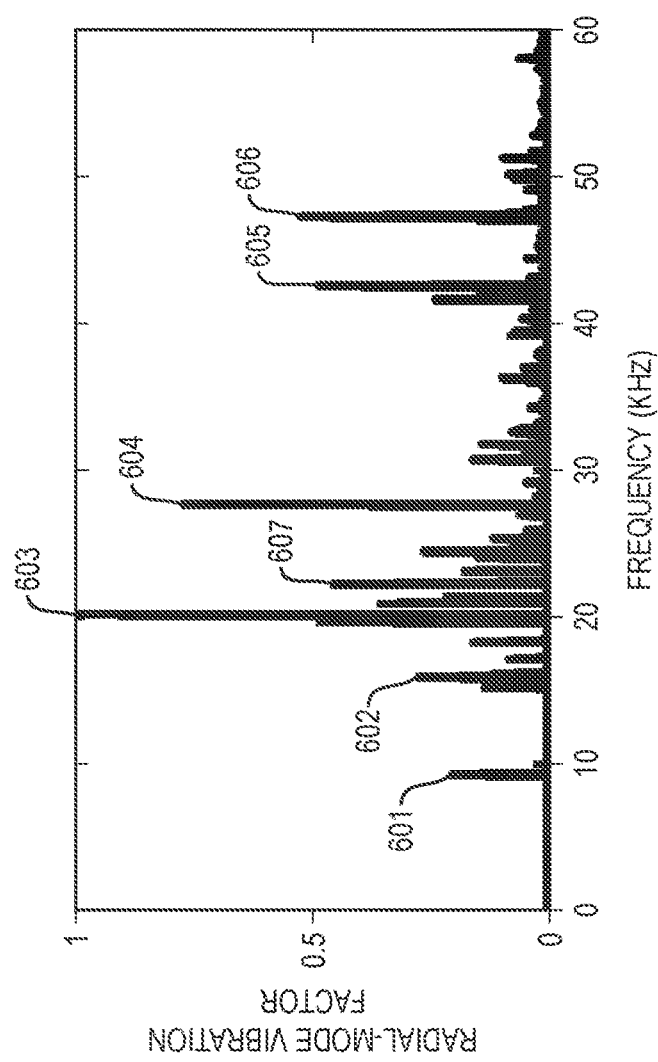

FIG. 6 shows another example of multiple eigenfrequencies, in an illustrative embodiment of this invention. In FIG. 6 (similarly to FIG. 4), the multiple eigenfrequencies occur in a transducer with concentric, cylindrical layers, including an outer piezoelectric layer, an outer piezoelectric layer, and a polymer coupling layer sandwiched between the two piezoelectric layers. However, in FIG. 6, the eigenfrequencies are different than in FIG. 4. This difference between FIGS. 4 and 6 may be due to differences in dimensions, material composition and/or spatial configuration of layers of the transducers. FIG. 6 plots amplitude of vibration as a function of frequency. In the example shown in FIG. 6, eigenfrequencies occur at peaks of amplitude of vibration, including peaks 601, 602, 603, 604, 605, 606, 607 among others. For instance, the respective peaks may occur at the nominal resonant frequency of the outer piezoelectric layer, the nominal resonant frequency of the inner piezoelectric layer, and at other eigenfrequencies of the transducer that arise due to coupling between these layers. The eigenfrequencies shown in FIG. 6 are non-limiting examples.

FIGS. 7, 8, 9, 10, 11, 12, and 13 show amplitude of vibration in different vibration eigenmodes that correspond to different eigenfrequencies, in an illustrative implementation of this invention. Again, in FIGS. 7-13, the multiple eigenfrequencies and multiple eigenmodes occur in a transducer with concentric, cylindrical layers, including an outer piezoelectric layer, an outer piezoelectric layer, and a polymer coupling layer sandwiched between the two piezoelectric layers. The outer piezoelectric layer 701 and the inner piezoelectric layer 702 are shown in FIGS. 7-13, but the polymer coupling layer is not shown in those Figures. In FIGS. 7-13, vibrations are visualized as a color heat map, in which red and navy blue represent high vibration amplitude and low vibration amplitude respectively. The eigenfrequencies shown in FIGS. 7-13 are non-limiting examples.

The eigenmode of vibration shown in FIG. 7 produces amplitude peak 601 in FIG. 6. Furthermore, the eigenmode of vibration shown in FIG. 7: (a) results from exciting the acoustic transducer at a frequency of 20 kHz; and (b) corresponds to the original radial vibration of the outer piezoelectric cylinder. In the eigenmode shown in FIG. 7, the outer layer exhibits large vibrations, while the inner layer is relatively static.

In the eigenmode of vibration shown in FIG. 9, the inner and outer piezoelectric layers exhibit large radial vibrations as demonstrated by the red and yellow central regions in both of them. This eigenmode corresponds to the scenario where the piezoelectric layers vibrate by bending in opposite radial directions to each other. Physically, this mode arises from the fact that both piezoelectric cylinders have the same height, which results in a bending mode vibration that is enhanced by stacking them together. (Note that this bending mode would also exhibit for each piezoelectric cylinder alone, but would be weaker than the radial mode shown in FIG. 7.)

The eigenmodes of vibration shown in FIGS. 10, 11, 12, and 13 are due, at least in part, to coupling between the two piezoelectric layers (via the polymer coupling layer). For instance, in the eigenmode shown in FIG. 11, the inner, cylindrical piezoelectric layer splits into two concurrent radial modes in the top and bottom half of the cylinder. The eigenmodes of vibration shown in FIGS. 10, 11, 12, and 13 would not occur in a single-layer piezoelectric cylinder in the absence of coupling.

In some implementations of this invention, an acoustic transducer has a large number of eigenmodes between 20 kHz and 60 kHz due to its coupled multi-layer configuration.

The eigenfrequencies for the eigenmodes of the acoustic transducers may mathematically modeled, along the different degrees of freedom of the multi-layered acoustic transducer, as:

$$\det(\omega^2 M - K) = 0 \quad \text{(Equation 1)}$$

where M is mass, K is stiffness and $\omega$ is angular frequency.

To solve the differential equation of Equation 1 along the different degrees of freedom of the multi-layered acoustic transducer, COMSOL Multiphysics® software may be employed. When doing so, coupling between layers (both piezoelectric and polymer) may be defined by applying continuity constraints on both pressure and velocity along the boundaries.

In illustrative implementations of this invention, different eigenfrequencies are associated with different eigenmodes of vibration. FIGS. 14A-14C and 16A-16C show non-limiting examples of eigenmodes of vibration that may, in some cases, be associated with different eigenfrequencies.

Figure 14C:
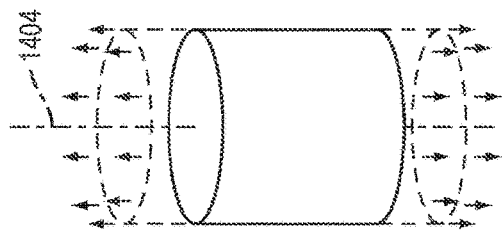
FIG. 14C illustrates a mode of vibration of a cylindrical piezoelectric layer, in which the layer vibrates in directions parallel to the cylindrical axis of the layer.
Figure 14B:
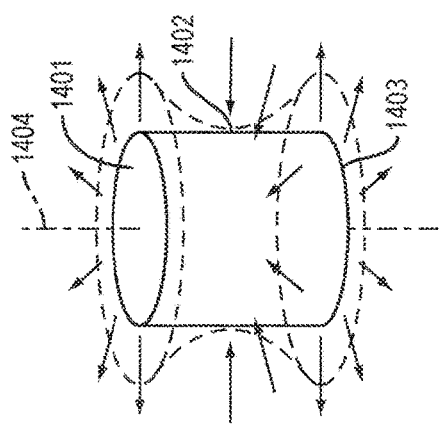
FIG. 14B illustrates a mode of vibration of a cylindrical piezoelectric layer, in which radial vibration of the top and bottom of the layer is out-of-phase with radial vibration of the middle of the layer.
Figure 14A:
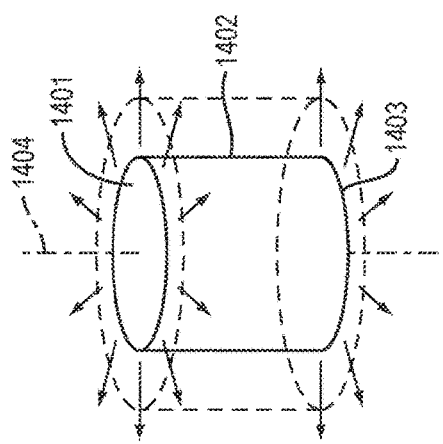
FIG. 14A illustrates a mode of vibration of a cylindrical piezoelectric layer, in which the top, middle and bottom of the layer are radially vibrating in phase with each other.

FIG. 14A illustrates a mode of vibration of a cylindrical piezoelectric layer, in which the top 1401, middle 1402 and bottom 1403 of the layer are radially vibrating in phase with each other. In this mode of vibration, the layer expands radially (as shown in FIG. 14A) and then contracts radially, in repeated cycles of vibration.

FIG. 14B illustrates a mode of vibration of a cylindrical piezoelectric layer, in which radial vibration of the top 1401 and bottom 1403 of the layer is out-of-phase with radial vibration of the middle 1402 of the layer. In this mode of vibration, each respective portion of the layer moves first in a radial direction (as shown in FIG. 14B) and then moves in the opposite radial direction, in repeated cycles of vibration.

In the preceding discussion of FIGS. 14A and 14B, "top", "bottom" and "middle" are positions along a vertical axis, in a local coordinate system in which vertical is defined to be parallel to the cylindrical axis 1404 of the transducer. Thus, a change in orientation of the cylindrical axis of transducer relative to the external world would not cause the "top", "bottom" and "middle" in FIGS. 14A and 14B to change.

FIG. 14C illustrates a mode of vibration of a cylindrical piezoelectric layer, in which the layer vibrates in directions parallel to the cylindrical axis 1404 of the layer. In this mode of vibration, the layer first expands parallel to that axis (as shown in FIG. 14C) and then contracts parallel to that axis, in repeated cycles of vibration.

In the examples shown in FIGS. 14A-14C, the layers are cylindrical in the sense that they have a cylindrical shape when not vibrating.

As noted above, in some cases, the piezoelectric layers and polymer coupling layers of the transducer are concentric and spherical. FIG. 15 shows a cross-section of concentric spherical layers of an acoustic transducer 1500, in an illustrative implementation of this invention. These concentric layers include an inner piezoelectric layer 1503, a polymer coupling layer 1502, and an outer piezoelectric layer 1501.

Figure 16C:
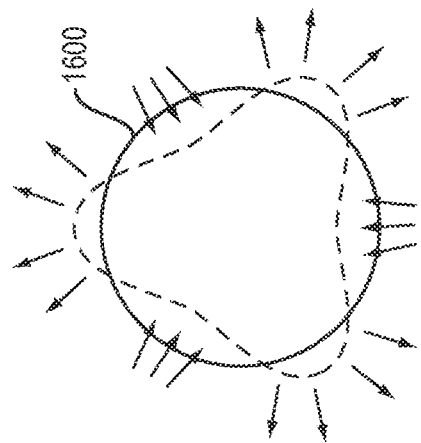
FIG. 16C shows a mode of vibration of a spherical piezoelectric layer, in which different parts of the layer are radially vibrating out-of-phase with each other.
Figure 16B:
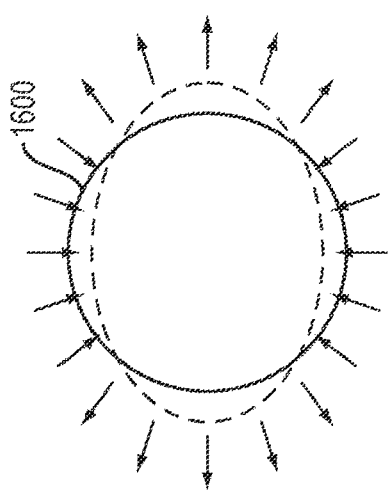
FIG. 16B shows a mode of vibration of a spherical piezoelectric layer, in which radial vibration of the top and bottom of the layer is out-of-phase with radial vibration of the middle of the layer.
Figure 16A:
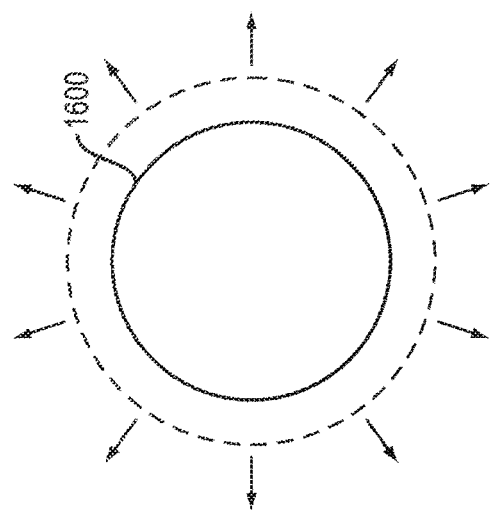
FIG. 16A shows a mode of vibration of a spherical piezoelectric layer, in which the entire layer is vibrating in phase in all radial directions.

FIG. 16A shows a mode of vibration of a spherical piezoelectric layer 1600, in which the entire layer is vibrating in phase in all radial directions.

FIG. 16B shows a mode of vibration of a spherical piezoelectric layer 1600, in which radial vibration of the top and bottom of the layer is out-of-phase with radial vibration of the middle of the layer.

FIG. 16C shows a mode of vibration of a spherical piezoelectric layer 1600, in which different parts of the layer are radially vibrating out-of-phase with each other.

In the examples shown in FIGS. 16A-16C, each respective portion of the layer moves first in a radial direction (as shown in those Figures) and then moves in the opposite radial direction, in repeated cycles of vibration. In the examples shown in FIGS. 16A-16B, the layers are spherical in the sense that they have a spherical shape when not vibrating.

Figure 17B:
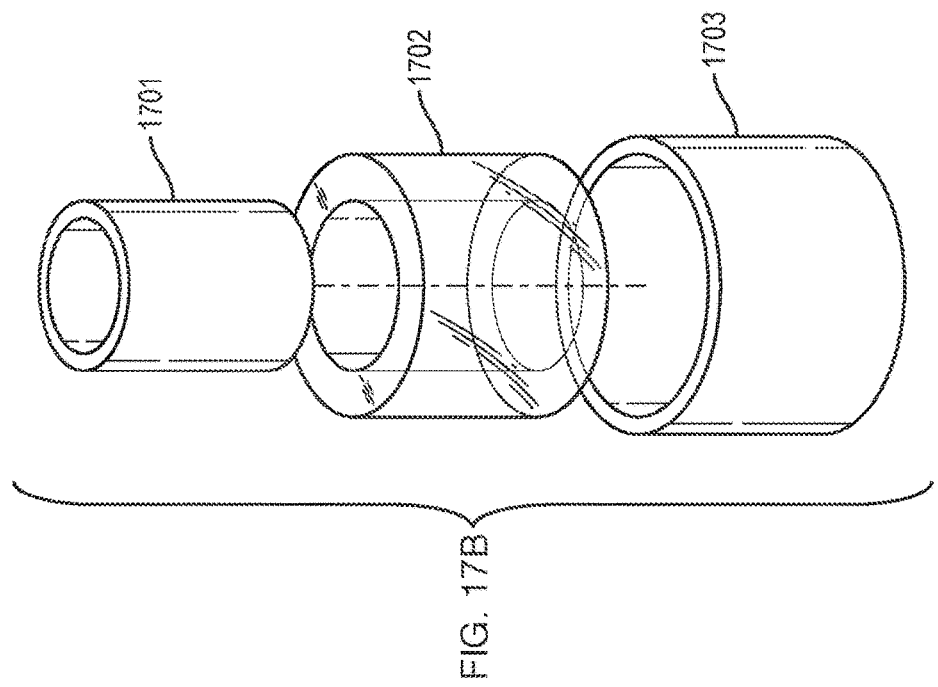
FIG. 17B is an exploded view of an inner piezoelectric layer, a polymer coupling layer, and an outer piezoelectric layer.
Figure 17A:
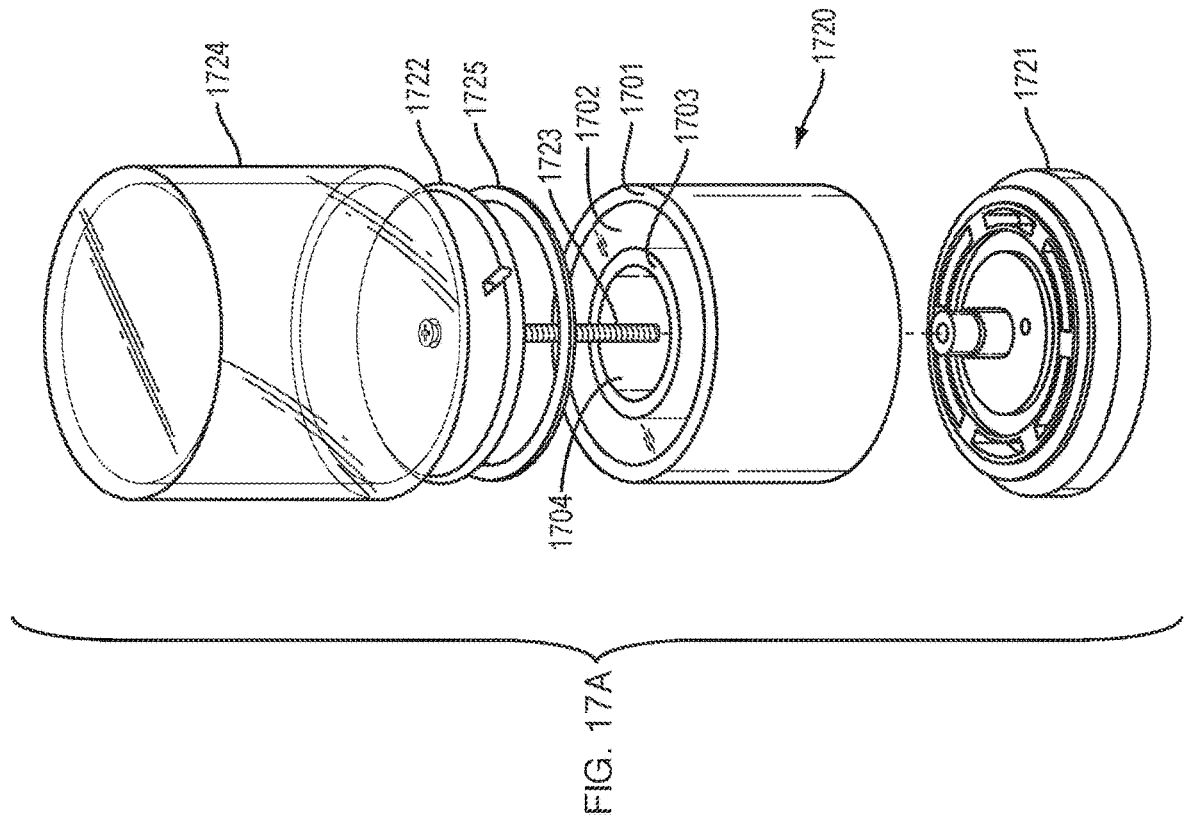
FIG. 17A is an exploded view of a partially potted acoustic transducer.

FIG. 17A is an exploded view of a partially potted acoustic transducer, in an illustrative implementation of this invention. In FIG. 17, the partially potted acoustic transducer includes an acoustic transducer 1720, a transducer base 1721, a transducer cap 1722, a polyurethane gasket 1725, a polyurethane enclosure 1724, and a screw 1723. The acoustic transducer 1720 comprises an inner piezoelectric layer 1703, a polyurethane coupling layer 1702, and an outer piezoelectric layer 1701.

In the example shown in FIG. 17A, the acoustic transducer 1720 is only partially potted because the inner piezoelectric layer 1703 surrounds a cavity 1704 filled with air. Thus, the acoustic transducer 1720 is what is sometimes called "air-backed", since the inner piezoelectric layer 1703 is in direct contact with air in cavity 1704. The air-filled cavity may tend to improve SNR of the acoustic transducer. Alternatively, the acoustic transducer may be fully potted (e.g., surrounded by a solid or gelatinous material which prevents air from contacting the piezoelectric layers of the acoustic transducer).

In some implementations, the acoustic transducer is impervious to liquid; that is, liquid does not penetrate into the interior of the transducer when the transducer is immersed in, exposed to, or in external contact with, the liquid. For instance, the acoustic transducer shown in FIG. 17A is waterproof and thus is well-suited for performing underwater acoustic communication. Likewise, the acoustic transducer shown in FIG. 17A is impervious to oil and other liquids (e.g., non-aqueous liquids), and thus is well-suited for performing acoustic communication through oil or other liquids. This is because, in FIG. 17A, the transducer base 1721, transducer cap 1722, polyurethane gasket 1725, and polyurethane enclosure 1724 together prevent liquid from penetrating into the air-filled cavity 1704 in the interior of the transducer.

In some cases, the piezoelectric and coupling layers are concentric, cylindrical, and nested one within another. FIG. 17B shows an example of this. FIG. 17B is an exploded view of an inner piezoelectric layer 1703, a polyurethane coupling layer 1702, and an outer piezoelectric layer 1701.

Acoustic Backscatter System

In some implementations of this invention, an acoustic backscatter system includes one or more transmitting speakers (projector(s)), a microphone (receiver), and a backscatter node. The projector(s) may send an acoustic signal which reflects off the backscatter node and returns to the microphone. The backscatter node may communicate by modulating its reflections. Specifically, the backscatter node may send bits of zero and one by alternating between reflective and non-reflective states. The microphone may record the received signals and may sense changes in reflection power in order to decode the transmitted bits.

The signal-to-noise ratio (SNR) of the received signal may depend on reflective and non-reflective states of the backscatter node. Specifically, this SNR may be modeled by the following equation:

$$SNR = \frac{|P_{reflective} - P_{non\text{-}reflective}|^2}{|N|^2} \quad \text{Equation 2}$$

where $P_{reflective}$ and $P_{non\text{-}reflective}$ refer to the pressure received by the microphone in the reflective and non-reflective states respectively, N refers to the amplitude of noise, and the square indicates the power.

We can simplify Equation 2 by rewriting it as a function of the reflection coefficient $\Gamma$ (of the backscatter node) and the incident pressure $P_{incident}$ (on the microphone) as follows:

$$SNR = |\Gamma_{reflective} - \Gamma_{non\text{-}reflective}|^2 \frac{|P_{incident}|^2}{|N|^2}$$

To modulate the reflection coefficient of sound, the acoustic backscatter nodes may rely on piezoelectric materials. Specifically, by opening and shorting the terminals across one or more piezoelectric layers (e.g., via one or more switches such as one or more transistors), each backscatter node may toggle between two reflective states, thus enabling backscatter communication.

In illustrative implementations of this invention, a UWB acoustic transducer (e.g., 300, 1500) onboard a backscatter node enables backscatter communication, by modulating sound waves that reflect from the transducer. In some cases, the modulation involves switching between reflective and non-reflective states of the transducer. For instance, the acoustic transducer may transmit a "0" bit by absorbing all (or a large portion) of the incoming energy, and may transmit a "1" bit by reflecting all (or a large portion of) the impinging acoustic signal. The transducer may switch between the reflective and absorptive states by modulating the voltage across a piezoelectric interface, which in turn determines its vibration amplitude (i.e., reflection). The microphone may receive the modulated acoustic signals and sense changes in the amplitude due to reflection. A microcontroller may decode these changes to recover the transmitted messages.

(In the preceding paragraphs of this section titled "Acoustic Backscatter System", we sometimes loosely refer to reflective and non-reflective states. However, these two states may actually be more reflective and less reflective, rather than reflective and non-reflective.)

The backscatter node may cause piezoelectric material to operate as a reflector by preventing the piezoelectric material from deforming (i.e., reducing or nulling the strain). Reducing the strain (i.e., reducing deformation of the piezoelectric material) tends to prevent the material from absorbing the incoming acoustic signal and thus tends to cause the material to reflect that signal. To reduce the deformation, the backscatter node may activate a transistor switch to electrically short two terminal electrodes of piezoelectric layer(s) in an acoustic transducer. Such switching may require near-zero power and may be done entirely using the harvested energy, enabling the backscatter node to be battery-free.

Figure 18:
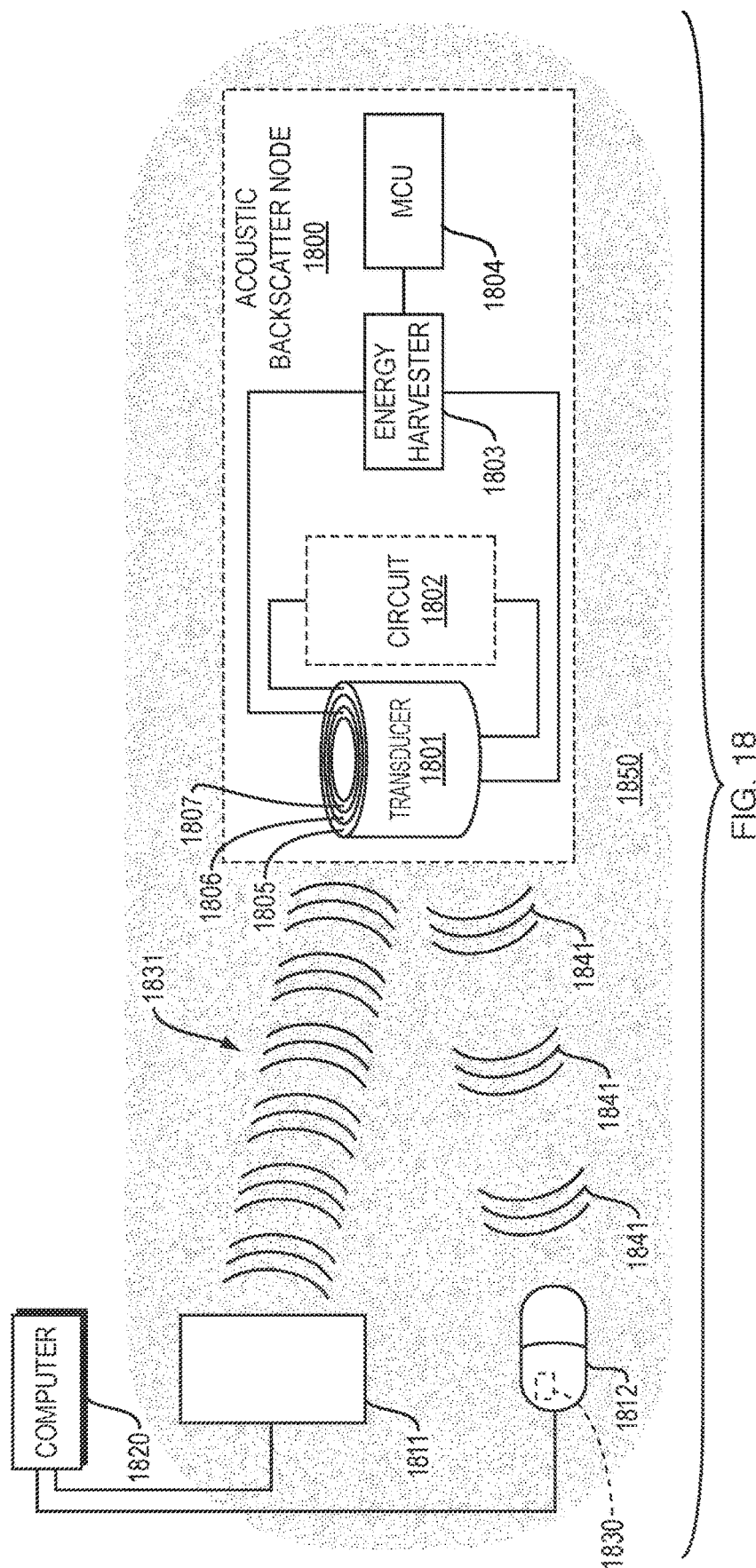
FIG. 18 is a diagram of an acoustic backscatter system.

FIG. 18 is a diagram of an acoustic backscatter system, in an illustrative implementation of this invention. In FIG. 18, a set of one or more acoustic transmitters 1811 transmits acoustic signals. We sometimes call an acoustic transmitter a "projector". In FIG. 18, each acoustic transmitter (in the set of one or more transmitters 1811) may include a multi-layered UWB acoustic transducer (e.g., 300, 1500) with multiple piezoelectric layers, at least one polymer coupling layer, and multiple eigenfrequencies. The acoustic transmitter(s) may convert electrical signals into sound. The acoustic signals 1831 that are emitted by transmitter(s) 1811 are sound waves that propagate through a liquid, solid and/or gaseous medium 1850, such as ocean water, fresh water, oil, natural gas, metal, wood, gypsum, cement, or air. The acoustic signals 1831 travel to an acoustic backscatter node 1800. The backscatter node 1800 modulates its acoustic reflectance, in such a way as to modify amplitude and/or phase of the acoustic signals that reflect from the backscatter node. The resulting modulated acoustic signals 1841 propagate through the liquid, solid and/or gaseous medium 1850 to a microphone 1812.

The microphone may include a transducer that converts an acoustic signal into an analog electrical signal. In some cases, microphone 1812 is a dynamic microphone (e.g., with a coil of wire suspended in a magnetic field), a condenser microphone (e.g., which employs a vibrating diaphragm as a capacitor plate), or a piezoelectric microphone. The microphone may include a preamplifier.

In some cases, the microphone (e.g. 1812, 2020) includes an analog filter (e.g., 1830, 2040). For instance, this analog filter may be a high-pass filter, low-pass filter or notch filter. The analog filter may filter out the signal which travels directly from the projector(s) to the microphone. (As discussed herein, the backscatter node may shift frequency of the uplink signal that reflects from the backscatter node. The analog filter may thus allow the uplink signal to pass and may filter out the downlink signal). In some cases, In some cases, the transmitter may, at many times during a communication session, produce a narrow-band downlink signal with only a single peak of amplitude in the frequency spectrum. However, at some times during a communication session, the transmitter may transmit with a larger bandwidth. For instance, at the beginning of a communication session with a backscatter node (e.g., waking up the node), the transmitter may transmit encoded instruments in a first frequency channel and may transmit another acoustic signal (e.g., for energy harvesting) in another frequency channel. In some cases, during the remainder of the communication session when the backscatter node is responding back, the transmitter transmits a downlink signal in a single frequency channel.

In some implementations: (a) the acoustic signals propagate through water; (b) the acoustic transmitter(s) 1811 are underwater speaker(s) that transmit acoustic signals through water; and (b) microphone 1812 is a hydrophone.

In some cases, all or part of the communication system is immersed inside, or surrounded by, or in direct physical contact with, a liquid, solid and/or gaseous medium. For instance, in some cases, the transmitter(s) 1811, backscatter node 1800, and a hydrophone (microphone 1812) are all immersed in ocean water or fresh water. Or, for instance, transmitter(s) 1811, backscatter node 1800 and microphone 1812 may each be external to, and may touch, a solid medium (such as cement, metal, plastic, a pipe or a building wall).

In FIG. 18, the backscatter node 1800 includes an acoustic transducer 1801, matching circuit 1802 with a controllable impedance, energy harvester 1803, and microcontroller (MCU) 1804. The acoustic transducer 1801 includes an inner piezoelectric layer 1807, a polyurethane coupling layer 1806, and an outer piezoelectric layer 1805.

The matching circuit 1802 may be electrically connected across two terminals of outer piezoelectric layer 1805. Alternatively, the matching circuit may be electrically connected across terminals of any one or more of the piezoelectric layers. For instance, the matching circuit may be electrically connected: (a) across the terminals of a single piezoelectric layer; or (b) across the terminals of multiple piezoelectric layers. (e.g., these multiple layers may be electrically connected in series or in parallel).

The energy harvester 1803 may be electrically connected across two terminals of inner piezoelectric layer 1807. Alternatively, the energy harvester may be electrically connected across terminals of any one or more of the piezoelectric layers. For instance, the energy harvester may be electrically connected: (a) across the terminals of a single piezoelectric layer; or (b) across the terminals of multiple piezoelectric layers (e.g., these multiple layers may be electrically connected in series or in parallel).

In some cases, the piezoelectric layers are not electrically connected to each other. In some cases, piezoelectric layers are electrically cross-connected (e.g., a piezoelectric layer of a first node is electrically connected to a piezoelectric layer of another node). For instance, an inner layer of a first node may be electrically connected to an inner or outer layer of another node.

In FIG. 18, the microcontroller 1804 may control the electrical impedance of matching circuit 1802, such as by causing one or more transistor switches in the circuit to open or close. By controlling this electrical impedance, the microcontroller may control the acoustic reflectance of outer piezoelectric layer 1805, and thus may control amplitude and/or phase of acoustic signals that reflect from the outer piezoelectric layer 1805.

When the inner piezoelectric layer 1807 is in an acoustically non-reflective (or low reflective) state, the acoustic transducer may absorb energy from an acoustic downlink signal, converting the acoustic signal into a time-varying electrical voltage. The energy harvester 1803 may include a multi-stage rectifier that rectifies and amplifies this voltage. The energy harvester 1803 may also include a supercapacitor that stores electrical energy.

Computer 1820 may control and interface with the transmitter(s) 1811 and the microphone 1812. In some cases, computer 1820 comprises a controller, microcontroller or microprocessor.

Computer 120 may cause the acoustic transmitter(s) 1811 to initially transmit a continuous, steady-state acoustic signal. The backscatter node 1800 may harvest energy from this signal. Computer 1820 may cause the transmitter(s) 1811 to send an acoustic query signal to initiate acoustic communication with backscatter node 1800. For instance, pulse width modulation (PWM) may encode bits in the query signal, in such a way that different length gaps between acoustic pulses may encode different bits (e.g., 0 and 1). The acoustic transducer 1801 onboard the backscatter node 1800 may convert the acoustic query signal into an electrical signal. This electrical signal, in turn, may be decoded by microcontroller 1804 onboard the backscatter node. Once microcontroller 1804 has successfully decoded the query signal, microcontroller 1804 may cause the backscatter node to modulate acoustic signals that are reflecting from the node, and to thereby send modulated acoustic signals to the microphone 1812. These modulated acoustic signals may encode the backscatter node's preamble followed by other data (e.g., data collected from a sensor). In some cases, multiple backscatter nodes are reflecting signals to the microphone concurrently. The preambles of the respective backscatter nodes may be known by computer 1820. By correlating, the computer may identify the respective preambles and thus the respective backscatter nodes that are sending signals. The backscattered signal may be encoded using an FMO scheme, Manchester scheme or other modulation scheme.

Figure 19:
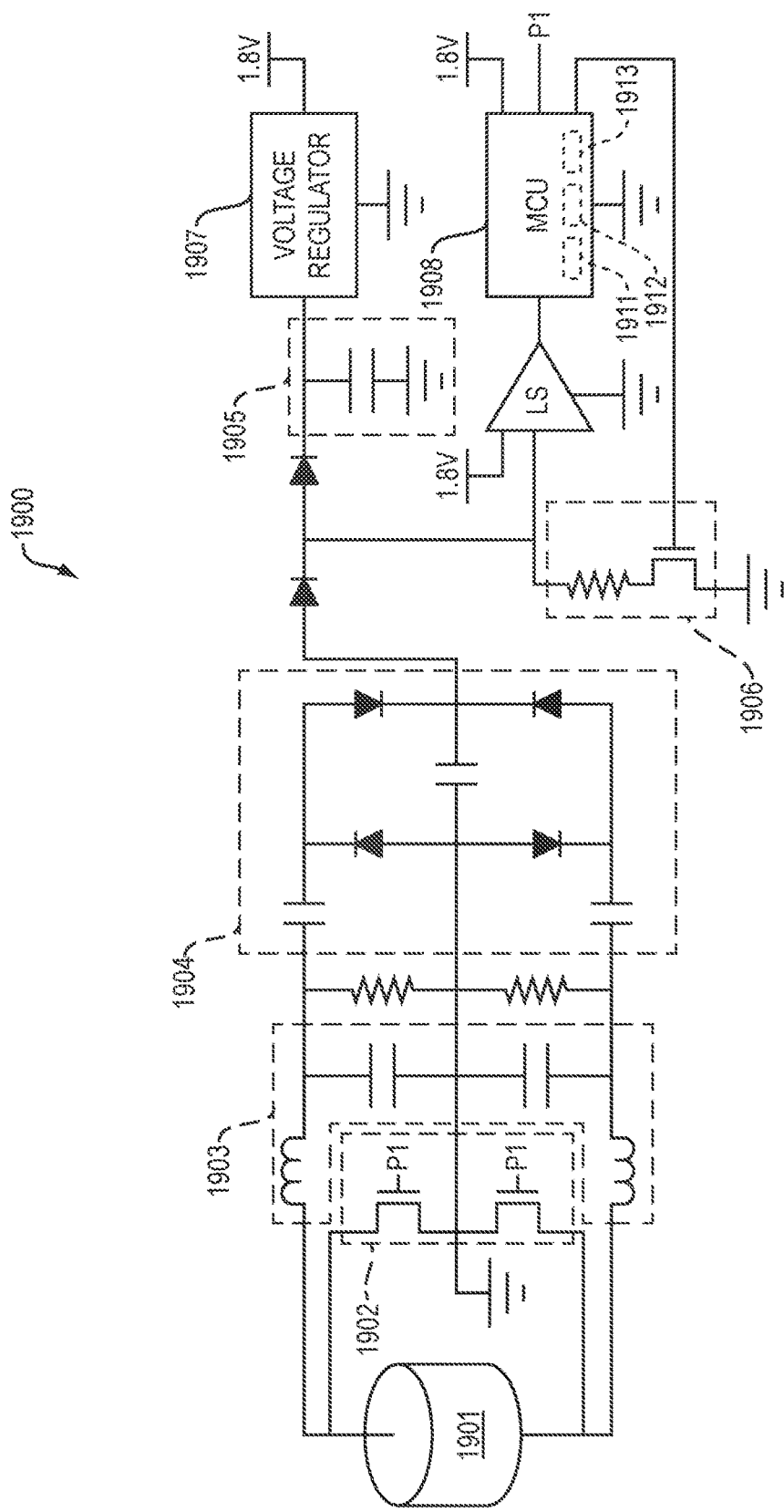
FIG. 19 is a circuit schematic for an acoustic backscatter node.

FIG. 19 is a circuit schematic for an acoustic backscatter node. In the example shown in FIG. 19, backscatter node 1900 includes: (a) an acoustic transducer 1901 which comprises at least an inner piezoelectric layer, an outer piezoelectric layer, and a polymer coupling layer; (b) switches 1902 that control the load impedance to enable backscatter communication, (c) a matching network 1903, (c) a rectifying circuit 1904 that converts AC to DC voltage and passively amplifies the voltage, (d) a supercapacitor 1905 that stores energy from the rectified DC voltage, (e) a pull-down transistor 1906 for improving the SNR (signal-to-noise ratio) of downlink and/or uplink signals, a voltage regulator 1907, and a microcontroller 1908. For instance, switches 1902 may comprise transistors.

Mitigating Self-Interference

In illustrative implementations, this invention solves a problem of self-interference that may otherwise arise in an acoustic backscatter system.

Self-interference could arise as follows: Backscatter communication is inherently full duplex, since the backscatter node communicates by modulating the reflections of a downlink signal. As a result, the microphone may receive a strong downlink signal from a projector as well as a weak backscatter reflection from a low-power node. Unfortunately, the projector's direct signal may overwhelm the receiving microphone and prevent it from detecting the weak backscatter response. Note that increasing the transmit power from the projector would not solve the problem because it boosts both the downlink signal as well as the backscatter response. In fact, boosting the transmit power would saturate the analog-to-digital converter (ADC) of the receiver and prevent it from being able to sense the backscatter response even if the backscattering node is nearby.

In illustrative implementations of this invention, in order to prevent self-interference, the backscatter node may leverage its wide frequency band to shift frequency of the uplink signal that reflects from the node, so that the uplink signal is not in the same frequency band as the downlink signal. A filter may be applied to the acoustic signal received by the microphone, in order to filter out the downlink signal and extract the uplink signal which has been shifted in frequency.

Here is a non-limiting example of shifting frequency to prevent self-interference, in an illustrative implementation of this invention. Let us assume that: (a) the center frequency of the downlink signal is $f_C$; and (b) the desired goal is for the backscatter node to send a packet of data p(t) in an acoustic uplink signal, where t is time. The backscatter node may shift the spectrum of the reflected uplink signal in such a way that that the two largest peaks of amplitude of the uplink signal occur at $f_c-f_o$ and $f_c+f_o$. To do so, the backscatter node may modulate the reflected signal in such a way that the amplitude of the uplink signal varies as a function of $p(t)\cos(2\pi f_o t)$. In this example, the received signal by the microphone may be given by the following equation:

$$y(t) = 1\ \cos(2\pi f_c t) + \text{hp}(t)\cos(2\pi f_c t)\cos(2\pi f_o t)$$
$$= 1\ \cos(2\pi f_c t) + 0.5\text{hp}(t)\cos(2\pi (f_c + f_o)t) +$$
$$0.5\text{hp}(t)\cos(2\pi (f_c + f_o)t)$$

where t is time, l is amplitude of the direct path signal from the projector, and h is the channel from the backscatter node to the receiver.

To continue the example of the preceding paragraph: the received signal may contain the downlink frequency at $f_c$ and the backscatter response at $f_c-f_o$ and $f_c+f_o$. For instance, if $f_c=40$ kHz and $f_o=25$ kHz, then: (a) the backscatter response is at 15 kHz and 65 kHz; (b) the downlink signal remains at 40 kHz; (c) the receiver may apply a low-pass filter whose cutoff is 30 kHz to eliminate the downlink signal, which leaves receiver with only the backscatter response at 15 kHz allowing the backscatter response to be easily decoded.

By mitigating the strong downlink signal, the projector may transmit higher power and receive a stronger response from a far-away backscatter node. A low-noise amplifier (LNA) may be positioned after an analog filter but before an ADC (analog-to-digital converter) to further improve the sensitivity of the receiver to a distant backscatter node.

As noted above, a low-pass filter may eliminate the downlink signal. Alternatively, a high-pass filter may mitigate self-interference. For instance, if $f_c=40$ kHz and $f_o=25$ kHz, then: (a) a high-pass filter with a cutoff frequency of about 50 kHz may be employed to mitigate self-interference; and (b), the receiver may retain the backscatter response at 65 kHz and may still decode it. Alternatively, a notch filter (e.g., an analog notch filter) may be employed to filter out the downlink filter and preserve both of the largest amplitude peaks of the uplink signal. For instance, if $f_c=40$ kHz and $f_o=25$ kHz, then a notch filter around 40 kHz may retain the uplink signal at both 15 kHz and 65 kHz to obtain an even better SNR.

Thus, in illustrative implementations of this invention, an ultra-wide bandwidth of the acoustic transducer onboard a backscatter node enables a backscatter communication system to divide its available spectrum to multiple orthogonal frequency channels and to use separate channels for downlink and uplink communication. This approach allows the system to cancel self-interference and decode the weak backscatter packet even if it is orders of magnitude weaker than the transmitted signal or the noise floor.

Scaling to Many Nodes

In some implementations, the ultra-wide bandwidth of the acoustic transducer enables a communication system to have a large number of backscatter nodes that communicate concurrently. The system may employ an FDMA-style MAC protocol for concurrent transmissions. This protocol may divide the overall available bandwidth into different sub-channels and allocate each sub-channel to a different backscatter node. In some implementations, the acoustic transducer has an ultra-wide bandwidth and thus may support a larger number of concurrent transmissions (e.g., up to ten) with minimal interference, even if the system has only a single microphone receiver.

To understand how a UWB transducer (e.g., 300, 1500) supports concurrent transmissions, let us consider a network with two backscatter nodes A and B, and let us assume that the goal is to allocate channels centered at $f_A$ and $f_B$ to these two nodes. To do so, the projector may instruct the two nodes to shift by appropriate frequencies in order to occupy their respective channels. Hence, it may send a downlink command signal, instructing node A to apply a shifting frequency of $f_C-f_A$ and node B to apply a shifting frequency of $f_C-f_B$, which would result in the desired shifts.

Mathematically, the microphone may receive the following signal:

$$y(t)=(l+h_A S_A(t)\cos(2\pi (f_C-f_A)t)+h_B S_B(t)\cos(2\pi (f_C-f_B)t)$$
$$\cos(2\pi f_C t)$$

where $S_A$ is the modulated bit sequence from a first backscatter node; and $S_B$ is the modulated bit sequence from a second backscatter node, $h_A$ is the channel from the first backscatter node to the receiver, and $h_B$ is the channel from the second backscatter node to the receiver, t is time, and l is amplitude of the direct path signal from the projector.

Subsequently, the receiver may simply apply a bandpass filter around $f_A$ and $f_B$ to decode the two concurrent transmissions. The same approach may be extended to a large number of nodes, each occupying a different subchannel $f_i$.

Due to the on-off switching nature of backscatter communication, the resulting backscatter signal may be a square wave (rather than a simple cosine). One challenge, here, is that the harmonics of the square wave may interfere with other nodes by overlapping with their channels. To prevent this, the projector may pre-determine orthogonal channels (whose harmonics don't interfere) in its channel allocation process. Moreover, a MAC protocol may maximize the spacing between the allocated channels, thus minimizing interference.

The backscatter frequency may be determined by how the backscatter switch is modulated (e.g., by a micro-controller). To program the backscatter frequency, the transmitter may send a command signal on the downlink instructing the node to modulate the backscatter switch, resulting in an uplink frequency $f_A$ Excitations at both the downlink frequency and the uplink frequency may drive mechanical vibrations of the multi-layered acoustic transducer, causing it to vibrate in corresponding eigenmodes.

Figure 20:
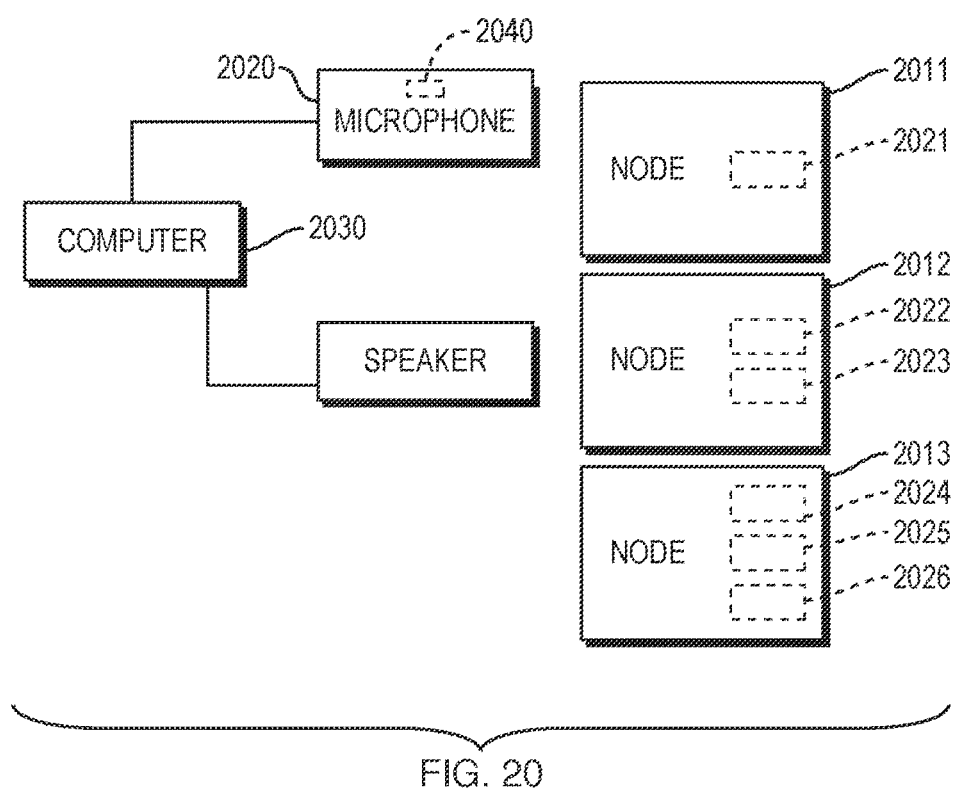
FIG. 20 is a diagram of an acoustic communication system with multiple backscatter nodes.

FIG. 20 is a diagram of an acoustic communication system with multiple backscatter nodes 2011, 2012, and 2013. In FIG. 20, acoustic speaker 2001 transmits acoustic signals that include, among other things, instructions regarding frequency channel allocation for the respective backscatter nodes. In FIG. 20, each backscatter node includes one or more sensors. Specifically: (a) backscatter node 2011 includes
sensor 2021; (b) backscatter node 2012 includes sensors 2022 and 2023; and (c) backscatter node 2013 includes sensors 2024, 2025 and 2026. A wide variety of low-power sensors (e.g., pH, pressure, temperature and salinity sensors) may be employed. In FIG. 20, the modulated acoustic signals that reflect from each backscatter node may (during certain time periods) encode sensor readings taken by the one or more sensors that are included in that node. A single microphone (e.g., hydrophone) 2020 may record the modulated acoustic signals from the different backscatter nodes. A computer 2030 may control and interface with the transmitters and microphone, and may decode data that is encoded in the modulated acoustic signals. For instance, computer 2030 may decode the sensor readings taken by the sensors in the backscatter nodes.

Prototype

The following 25 paragraphs describe a prototype of this invention.

In this prototype, an acoustic transducer comprises a layered piezoceramic structure. The outer piezoceramic cylinder has a nominal resonance frequency of 17 kHz and has an outer radius of 27 mm, inner radius of 23.5 mm, and height of 40 mm. The inner piezoceramic cylinder is made by stacking two smaller piezoelectric cylinders, each of which has a nominal resonance frequency of 30 kHz, an outer radius of 18 mm, an inner radius of 15.5 mm, and a height of 20 mm. These two smaller cylinders are stacked (electrically and mechanically) and then soldered together to obtain an inner piezoelectric cylinder with the same height as the outer cylinder. Wires may be soldered to the inner and outer surfaces of each of the cylindrical layers, resulting in a total of four terminals per acoustic transducer. To couple the vibration of the two piezoceramic cylinders, the space between them is completely filled with polyurethane. This results in a polyurethane coupling layer that is in contact with, and bonded to, the walls of both piezoceramic layers. This bonding, in turn, facilitates vibrational coupling between the two piezoelectric layers.

In this prototype, fabrication of an acoustic transducer starts by 3D printing the base and cap. Then, a polyurethane gasket is laser cut with 2 mm thickness to match the size of each of the two cylinders. The gasket and then piezoceramic cylinders are placed in their designated locations on the base. Then the cap and base are screwed together and tightened. This ensures that the inside of the internal piezo remains air-backed even after dipping the transducer in water. This so-called "air-backed" configuration may yield better performance.

In this prototype, during fabrication of an acoustic transducer, capped piezocylinders are placed inside the 3D printed mold. A polyurethane WC-575A mixture is poured into the cylinder mold. A transparent cylinder mold is used to ensure that the outer surface of the entire structure is covered by the polyurethane mixture, which insulates it from the surrounding environment. The transducer base has several openings in the region sandwiched between the two piezoceramic cylinders. These openings guide the poured polyurethane polymer to completely fill the gap and spacing between two piezoceramic layers. Afterwards, the structure is placed for 12 hours inside a pressure chamber at a pressure of 60 psi to remove any bubbles from the polyurethane solution. (Alternatively, a vacuum chamber may be used to remove the bubbles.)

In this prototype, to communicate via backscatter, each backscatter node shorts and opens two terminals of a piezoelectric layer of a transducer. A multi-layer transducer may have four terminals—two for each of its active layers. This may provide different options for backscattering by shorting and opening any of the two terminals.

In this prototype, backscatter communication is performed simultaneously with energy harvesting. To do so, a modulating transistor may be electrically connected across the terminals of the outer piezoelectric layer while connecting an energy harvesting circuit across the terminals of the inner piezoelectric layer. This enables a backscatter node to continuously operate without alternating periods of energy harvesting and backscatter.

Alternatively, in this prototype, one or more modulating transistors may be electrically connected across terminals of any one or more of the piezoelectric layers of an acoustic transducer. For instance, the modulating transistor(s) circuit may be electrically connected: (a) across the terminals of a single piezoelectric layer; or (b) across the terminals of multiple piezoelectric layers (e.g., electrically in series, or electrically in parallel). Likewise, the energy harvesting circuit may be electrically connected across terminals of any one or more of the piezoelectric layers of an acoustic transducer. For instance, the energy harvesting circuit may be electrically connected: (a) across the terminals of a single piezoelectric layer; or (b) across the terminals of multiple piezoelectric layers (e.g., electrically in series, or electrically in parallel). In some cases, in this prototype, the piezoelectric layers are not electrically connected to each other. In some cases, in this prototype, piezoelectric layers are electrically cross-connected (e.g., a piezoelectric layer of a first node is electrically connected to a piezoelectric layer of another node). For instance, an inner layer of a first node may be electrically connected to an inner or outer layer of another node.

In this prototype, the downlink projector encodes bits via PWM (pulse-width modulation) and uplink (backscatter) communication is performed via FMO modulation. In this prototype, a backscatter node may be powered by energy-harvesting or at least in part by an on-board battery. The power consumption for a backscatter node may range from $120^\mu$ W to $500^\mu$ W. The backscatter approach enables very low power consumption, which may extend the battery life of any onboard battery.

In this prototype: (a) the microphone comprises a hydrophone; (b) the acoustic projector and backscatter node are waterproof; and (c) the backscatter system performs underwater communication.

Tests of this prototype were performed in a river which had a depth of around 4 m. In these tests: (a) the acoustic transmitter sent a downlink signal at a frequency of 37.5 kHz; (b) the backscatter node modulated this signal at different rates; (c) the hydrophone measured the SNR of the received signal at the corresponding frequency; (d) the backscatter signal's SNR remained high across the entire band spanning 10 kHz to 60 kHz; and (e) acoustic backscatter nodes communicated at round trip distances of up to 60 m (SNR>3 dB).

In a test of this prototype, applying longer codes enabled acoustic communication over longer distances. Specifically, 30 s, 60 s, and 120 s codes communicated up to 32 m, 48 m and 60 m respectively.

In a test of this prototype, concurrent signals from up to 10 backscatter nodes in a backscatter system were decoded successfully, despite their close spatial proximity and interference. The system may be scaled to more concurrent transmissions by exploiting spatial reuse.

In this prototype, backscatter nodes operate at a bit rate of 100 kbps.

In this prototype, the backscatter node has a differential analog front-end (including every element shown in FIG. 18, except the microcontroller).

In this prototype, a piezoelectric resonator provides a differential output (rather than a single-ended output with a ground). Hence, the analog front-end adopts a differential design as can be seen in the mirrored architecture in FIG. 19, where the upper and lower portion of the energy harvesting and backscatter units are mirror images of each other.

In this prototype, to enable backscatter communication, two transistors may be inserted in series between the two terminals of the piezoelectric device. The middle junction of the two transistors may be connected to ground, enabling symmetric backscatter and maximizing the SNR of the backscattered signal. The transistors may act as switches to enable toggling the piezoelectric interface between reflective and non-reflective stages, when they are operating in short-circuit and open-circuit modes, respectively. The gates of the transistors may be controlled by the microcontroller. The series configuration (in which the two transistors are in series) may enable controlling the switches at a lower gate-to-source voltage ($V_{GS}$) since the source is always at ground. This allows the microcontroller to switch between the two states at a low threshold voltage.

In this prototype, a multi-stage rectifier and a storage capacitor are used for harvesting electrical energy. The multi-stage rectifier transforms the alternating electrical signal coming from the transducer into a DC voltage by passing it through diodes and capacitors. The multi-stage rectifier passively amplifies the voltage to a level sufficient to activate the digital components of the circuit design. The rectified DC charge is stored in a 1000 microFarad supercapacitor.

In this prototype, load-matching is employed to achieve efficient energy harvesting. Specifically, during energy harvesting, the complex conjugate of the output impedance $Z_L$ of the piezoelectric transducer may be matched to the input impedance $Z_L$ of the load, that is $Z_L=Z^*_S$. An impedance matching network 303 (which includes an inductor and a capacitor) may be inserted between the piezoelectric transducer and the rectifier.

In this prototype, an energy-harvesting supercapacitor is connected to a low-dropout (LDO) voltage regulator, the output of which is 1.8 V. The voltage regulator drives the digital components of the circuit, ensuring they are not damaged or operated in an unsteady mode.

In this prototype, the backscatter node employs envelope detection to decode data in the modulated acoustic signals. The downlink communication signal (from acoustic speaker to backscatter node) is encoded using PWM (pulse width modification), where a larger pulse width corresponds to a "1" bit and a shorter pulse width corresponds to a "0" bit. In order to decode these pulses, the backscatter node performs edge detection to identify the bit (pulse) boundaries and durations.

In this prototype, a Schmitt trigger discards small amplitude changes in voltage due to noise and discretizes the output into two main voltage levels: high and low. A level shifter scales the voltage levels to properly condition them as inputs to a microcontroller.

In this prototype, a pull-down transistor in the backscatter node improves both the energy harvesting efficiency and the decodability of the downlink signal. Specifically, the pull-down transistor acts as an open-circuit in the cold-start phase (i.e., when the super-capacitor is charging) to ensure that all the incoming energy flows to the capacitor enabling fast charging. Once the capacitor has enough voltage to power on the voltage regulator and the microcontroller (MCU), the MCU applies a voltage on the pull-down transistor changing it to a closed circuit. While this leaks some of the energy to ground, it also maximizes the difference between the high and low voltage levels at the input to the Schmitt trigger, thus improving the SNR for decoding the downlink PWM signal.

In this prototype, an ultra-low power microcontroller that is onboard the backscatter node reduces power consumption. The microcontroller can operate with a supply voltage as low as 1.8V and consumes less than 230 microamps at 1.8V in active mode and 0.5 microamps in low power mode (LMP3) with just one active clock using a crystal oscillator operating at 32.8 kHz.

In this prototype, the microcontroller powers up. The microcontroller may prepare to receive and decode a downlink command by enabling interrupts and initializing a timer to detect a falling edge at its pin which is connected to the output of the level shifter; then, it enters LMP3 mode. A falling edge at the microcontroller's input may raise an interrupt waking up the microcontroller, which enters active mode to compute the time interval between every edge to decode bit "0" or "1" of the query, before going back to low-power mode.

In this prototype, after the microcontroller successfully decodes downlink signals from the acoustic projector, the microcontroller may prepare for backscatter. The microcontroller: (a) may switch the timer to continuous mode to enable controlling the switch at the backscatter frequency; and (b) may employ FM0 encoding. An output pin of the microcontroller is connected to the two switching transistors enabling them to toggle the transducer between reflective and non-reflective states.

In this prototype, the microcontroller may also communicate with analog and digital peripheral sensors. The ADC pin is used for sampling analog sensors and the I²C protocol is used to communicate with digital sensors.

The prototype described in the preceding 25 paragraphs is a non-limiting example of this invention. This invention may be implemented in many other ways.

Computers

In illustrative implementations of this invention, one or more computers (e.g., servers, network hosts, client computers, integrated circuits, microcontrollers, controllers, microprocessors, processors, field-programmable-gate arrays, personal computers, digital computers, driver circuits, or analog computers) are programmed or specially adapted to perform one or more of the following tasks: (1) to control the operation of, or interface with, hardware components of an acoustic backscatter communication system, including acoustic transmitter(s), microphone(s), and acoustic backscatter node(s); (2) to control encoding of data in acoustic signals in accordance with one or more communication protocols; (3) to decode data in acoustic signals; (4) to perform digital filtering; (5) to control energy harvesting and power storage; (6) to control modulation of impedance of a circuit electrically connected to an acoustic transducer, in order to control acoustic reflectance of the transducer and thereby to control modulation of an acoustic signal that reflects from transducer; (7) to select an oscillator onboard a backscatter node; (8) to control the frequency at which one or more piezoelectric layers in a transducer are excited; (9) to allocate frequency channels to different backscatter nodes; (10) to control a frequency shift that is performed by a backscatter node to shift the frequency of a backscatter node; (11) to receive data from, control, or interface with one or more sensors; (12) to perform any other calculation, computation, program, algorithm, or computer function described or implied herein; (13) to receive signals indicative of human input; (14) to output signals for controlling transducers for outputting information in human perceivable format; (15) to process data, to perform computations, and to execute any algorithm or software; and (16) to control the read or write of data to and from memory devices (tasks 1-16 of this sentence being referred to herein as the "Computer Tasks"). The one or more computers (e.g., 1801, 1804, 1901, 1908, 2030) may each comprise: (a) a central processing unit, (b) an ALU (arithmetic logic unit), (c) a memory unit, and (d) a control unit that controls actions of other components of the computer in such a way that encoded steps of a program are executed in a sequence. In some cases, the one or more computers communicate with each other or with other devices: (a) wirelessly; (b) by a wired connection, such as an electrical wire, an electrical cable or a fiber-optic link; or (c) by a combination of wireless and wired links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, machine readable media, with instructions encoded thereon for one or more computers to perform one or more of the Computer Tasks. In some implementations, these one or more media are not transitory waves and are not transitory signals.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

"AC" means alternating current.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

A non-limiting example of a first layer being "attached" to a second layer is the first layer adhering to the second layer due to one or more of chemical adhesion, dispersive adhesion, diffusive adhesion, and mechanical attachment.

"Audio spectrum" means the range of frequencies that are greater than or equal to 20 Hertz and less than or equal to 20,000 Hertz.

To compute "based on" specified data means to perform a computation that takes the specified data as an input.

"CDMA" means code-division multiple access.

The term "comprise" (and grammatical variations thereof) shall be construed as if followed by "without limitation". If A comprises B, then A includes B and may include other things.

The term "computer" means a computational device that is configured to perform logical and arithmetic operations. Each of the following is a non-limiting example of a "computer", as that term is used herein: (a) digital computer; (b) analog computer; (c) computer that performs both analog and digital computations; (d) microcontroller; (e) controller; (f) microprocessor; (g) processor; (h) field-programmable gate array; (i) tablet computer; (j) notebook computer; (k) laptop computer, (l) personal computer; (m) mainframe computer; (n) integrated circuit; (o) server computer; (p) client computer; and (q) quantum computer. However, a human is not a "computer", as that term is used herein.

"Computer Tasks" is defined above.

As used herein, a "curved cylindrical shape" means geometric shape of a curved surface of a right circular cylinder.

"DC" means direct current.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

Each equation above may be referred to herein by the equation number set forth to the right of the equation. Non-limiting examples of an "equation", as that term is used herein, include: (a) an equation that states an equality; (b) an inequation that states an inequality; (c) a mathematical statement of proportionality or inverse proportionality; (d) a system of equations; (e) a mathematical optimization problem; or (f) a mathematical expression.

The fact that an "example" or multiple examples of something are given does not imply that they are the only instances of that thing. An example (or a group of examples) is merely a non-exhaustive and non-limiting illustration.

"FDMA" means frequency-division multiple access.

To "filter out" a signal means to prevent at least a portion of the signal from passing through a filter.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

As used herein, to say that amplitude of vibration "locally peaks" at certain frequencies means that it locally peaks at at least the certain frequencies.

"MAC" means media access control.

To "multiply" includes to multiply by an inverse. Thus, to "multiply" includes to divide.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

As used herein, to say that a first quantity differs by "more than x percent" from a second quantity means that the absolute value of the difference between the first and second quantities is greater than y, where $$y = \left(\frac{x}{100}\right)A$$

and A is the first quantity. For instance, to say that a first frequency B differs by more than five percent from a second frequency means that the absolute value of the difference between the first and second frequencies is greater than 0.05 B.

As used herein, a "primary resonant frequency" of a first object means a resonant frequency of the first object that would occur if the first object were not mechanically coupled to any other object. However, the term "primary resonant frequency" does not create any implication regarding whether coupling is actually occurring. For example, a layer of a device may be mechanically coupled to other layers of the device and still have a "primary resonant frequency", the term "primary resonant frequency" specifying frequency at which resonance would occur if coupling were absent. As a non-limiting example, a "primary resonant frequency" of a first layer of a device means a resonant frequency of the first layer that would occur if the first layer were not mechanically coupled to any other object (including any other layer of the device).

A group with no elements is not a "set", as that term is used herein.

Unless the context clearly indicates otherwise, "some" means one or more.

"SNR" means signal-to-noise ratio.

As used herein, a "subset" of a set consists of less than all of the elements of the set.

The term "such as" means for example.

To say that a machine-readable medium is "transitory" means that the medium is a transitory signal, such as an electromagnetic wave.

"Ultrasonic spectrum" means the range of frequencies that are greater than 20,000 Hertz and less than or equal to 1 Gigahertz.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall override any definition of the particular term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is an acoustic transducer comprising a first set of two or more layers and a second set of one or more layers, wherein: (a) each layer in the first set of layers has a primary resonant frequency which differs, by at least five percent, from any primary resonant frequency of any other layer in the first set of layers; (b) each particular layer in the second set of one or more layers (i) is positioned between, touching, and attached to, certain layers of the first set of layers, and (ii) has a Young's modulus that is less than that of each of these certain layers; and (c) the acoustic transducer is configured in such a way that, when the layers in the first set of layers vibrate, coupling between the first and second sets of layers causes amplitude of vibration of the acoustic transducer to locally peak at multiple other frequencies, the amplitude of vibration at each of the other frequencies being larger than would otherwise occur if the coupling were absent. In some cases, the acoustic transducer is configured to modulate reflection of an acoustic signal in such a way that the signal, as reflected from the transducer, encodes data. In some cases, the acoustic transducer is configured to operate underwater. In some cases, each layer in the first set of layers comprises a piezoelectric material. In some cases, at least one physical surface of each respective layer in the first set of layers has a curved cylindrical shape. In some cases, the acoustic transducer is configured to operate, at least at some times, as part of a system that converts acoustic energy into stored electrical energy. Each of the cases described above in this paragraph is an example of the acoustic transducer described in the first sentence of this paragraph, and is also an example of an embodiment of this invention that may be combined with other embodiments of this invention. Also, the acoustic transducer described in the first sentence of this paragraph may be combined with other embodiments of this invention.

In some implementations, this invention is a system comprising: (a) an acoustic backscatter node; (b) an acoustic transmitter; and (c) an acoustic receiver; wherein the system is configured to perform communication in such a way that (i) the transmitter transmits an acoustic downlink signal at a first center frequency, which downlink signal travels to both the receiver and the backscatter node, (ii) the backscatter node causes a shift in frequency by modulating the downlink signal in such a way that an acoustic uplink signal (A) reflects from the backscatter node at a second center frequency, which second center frequency is different from the first center frequency, and (B) travels to the receiver, and (iii) the receiver performs analog filtering to filter out the downlink signal. In some cases, the system has a longer communication range than the system would have in the absence of the shift in frequency and the analog filtering. In some cases, the transmitter is configured to transmit the acoustic downlink signal in such a way that the downlink signal travels through one or more materials before reaching the backscatter node, the one or more materials including at least one material from a set of materials, which set of materials consists of metal, cement, soil, air, a gaseous material, a solid material, oil, or a liquid other than water. In some cases: (a) the acoustic backscatter node includes an acoustic transducer, which acoustic transducer comprises a first set of two or more layers and a second set of one or more layers; (b) each layer in the first set of layers has a primary resonant frequency which differs, by at least five percent, from any primary resonant frequency of any other layer in the first set of layers; (c) each particular layer in the second set of one or more layers (i) is positioned between, touching, and attached to, certain layers of the first set of layers, and (ii) has a Young's modulus that is less than that of each of these certain layers; and (d) the acoustic transducer is configured in such a way that, when the layers in the first set of layers vibrate, coupling between the first and second sets of layers causes amplitude of vibration of the acoustic transducer to locally peak at multiple other frequencies, the amplitude of vibration at each of the other frequencies being larger than would otherwise occur if the coupling were absent. In some cases, the resonant frequencies and the multiple other frequencies are each in a frequency band, which frequency band consists of the audio spectrum and the ultrasonic spectrum. In some cases: (a) the acoustic receiver includes one or more analog high-pass filters; and (b) the one or more analog filters are configured to perform the analog filtering to filter out the downlink signal. Each of the cases described above in this paragraph is an example of the system described in the first sentence of this paragraph, and is also an example of an embodiment of this invention that may be combined with other embodiments of this invention. Also, the system described in the first sentence of this paragraph may be combined with other embodiments of this invention.

In some implementations, this invention is a system comprising: (a) a set of multiple acoustic backscatter nodes; (b) an acoustic transmitter; and (c) an acoustic receiver; wherein the system is configured to perform communication in such a way that (i) the transmitter transmits an acoustic downlink signal at a first center frequency, which downlink signal travels to the receiver and to the set of backscatter nodes, (ii) each particular backscatter node in the set causes a shift in frequency by modulating the downlink signal in such a way that an acoustic uplink signal (A) reflects from the particular backscatter node at an other center frequency, which other center frequency is different from (I) the first center frequency and (II) any center frequency of any uplink signal which reflects from any other backscatter node in the set, and (B) travels to the receiver, and (iii) the receiver decodes the uplink signals received from the respective backscatter nodes. In some cases, the system has a longer communication range than the system would have in the absence of the shift in frequency and the decoding. In some cases, the decoding includes analog or digital filtering to filter out the downlink signal. In some cases, the shift in frequency by the particular backscatter node reduces collisions between (a) the uplink signal that reflects from the particular backscatter node and (b) uplink signals that reflect from other backscatter nodes in the set. In some cases: (a) the acoustic transmitter does not transmit instructions that specify the other center frequency; and (b) the particular backscatter node selects the other center frequency. In some cases, the acoustic transmitter transmits instructions that specify the other center frequency. In some cases: (a) the acoustic transmitter transmits instructions that specify center frequencies for the uplink signals that reflect from the respective backscatter nodes in the set, one center frequency for each uplink signal; and (b) the center frequencies for the uplink signals are allocated in such a way that, for each pair of backscatter nodes in the set (i) the pair includes a first backscatter node and a second backscatter node, the first backscatter node being at a greater distance from the transmitter than is the second backscatter node, (ii) a first center frequency is allocated to the first backscatter node and a second center frequency is allocated to the second backscatter node, and (iii) the first center frequency would tend to result in a higher signal-to-noise ratio than would the second center frequency if all other factors including distance were equal. In some cases, for each particular backscatter node in the set: (a) the particular backscatter node includes multiple different oscillators and an acoustic transducer; and (b) the particular backscatter node selects which of the oscillators to drive vibration of the acoustic transducer. Each of the cases described above in this paragraph is an example of the system described in the first sentence of this paragraph, and is also an example of an embodiment of this invention that may be combined with other embodiments of this invention. Also, the system described in the first sentence of this paragraph may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. An acoustic transducer comprising a first set of two or more layers and a second set of one or more layers, wherein:
    (a) each layer in the first set of layers has a primary resonant frequency which differs, by at least five percent, from any primary resonant frequency of any other layer in the first set of layers;
    (b) each particular layer in the second set of one or more layers
        (i) is positioned between, touching, and attached to, certain layers of the first set of layers, and
        (ii) has a Young's modulus that is less than that of each of these certain layers; and
    (c) the acoustic transducer is configured in such a way that, when the layers in the first set of layers vibrate, coupling between the first and second sets of layers causes amplitude of vibration of the acoustic transducer to locally peak at multiple other frequencies, the amplitude of vibration at each of the other frequencies being larger than would otherwise occur if the coupling were absent.

2. The acoustic transducer of claim 1, wherein the acoustic transducer is configured to modulate reflection of an acoustic signal in such a way that the signal, as reflected from the transducer, encodes data.

3. The acoustic transducer of claim 1, wherein the acoustic transducer is configured to operate underwater.

4. The acoustic transducer of claim 1, wherein each layer in the first set of layers comprises a piezoelectric material.

5. The acoustic transmitter of claim 1, wherein at least one physical surface of each respective layer in the first set of layers has a curved cylindrical shape.

6. The acoustic transducer of claim 1, wherein the acoustic transducer is configured to operate, at least at some times, as part of a system that converts acoustic energy into stored electrical energy.

* * * * *